(12) United States Patent
Hwang et al.

(10) Patent No.: US 9,491,283 B2
(45) Date of Patent: Nov. 8, 2016

(54) APPARATUS, SYSTEMS AND METHODS OF COMMON MODE BASED DIAGNOSTICS

(75) Inventors: Chan-Soo Hwang, Sunnyvale, CA (US); Geoffrey G. Moyer, Portola Valley, CA (US); Mark B. Flowers, Los Gatos, CA (US)

(73) Assignee: Adaptive Spectrum and Signal Alignment, Inc., Redwood City, CA (US)

( * ) Notice: Subject to any disclaimer, the term of this patent is extended or adjusted under 35 U.S.C. 154(b) by 0 days.

(21) Appl. No.: 14/384,366

(22) PCT Filed: Mar. 12, 2012

(86) PCT No.: PCT/US2012/028783
§ 371 (c)(1),
(2), (4) Date: Sep. 10, 2014

(87) PCT Pub. No.: WO2013/137853
PCT Pub. Date: Sep. 19, 2013

(65) Prior Publication Data
US 2015/0030139 A1 Jan. 29, 2015

(51) Int. Cl.
*H04M 1/24* (2006.01)
*H04M 3/08* (2006.01)
*H04M 3/22* (2006.01)
(Continued)

(52) U.S. Cl.
CPC .............. *H04M 3/26* (2013.01); *H04M 3/306* (2013.01); *H04M 11/062* (2013.01)

(58) Field of Classification Search
CPC ........... H04M 3/2209; H04M 11/062; H04M 3/306; H04M 3/30; H04M 3/305; H04M 1/24

USPC ......... 379/1.01, 1.03, 1.04, 22.02, 24, 27.01
See application file for complete search history.

(56) References Cited

U.S. PATENT DOCUMENTS 6,477,238 B1 * 11/2002 Schneider et al. ......... 379/22.04
6,741,676 B2 * 5/2004 Rudinsky et al. ......... 379/27.04
(Continued)

FOREIGN PATENT DOCUMENTS

WO   WO-0101597   1/2001

OTHER PUBLICATIONS

International Search Report and Written Opinion for International Patent Application No. PCT/US2012/028783, dated Dec. 5, 2012, 9 pages.
(Continued)

*Primary Examiner* — Quoc D Tran
(74) *Attorney, Agent, or Firm* — Green, Howard & Mughal LLP

(57) ABSTRACT

In accordance with embodiments disclosed herein, there are provided apparatus, systems and methods for detecting a boundary condition via common mode diagnostics; and to apparatus, systems and methods for detecting a fault condition via common-mode rejection ratio diagnostics. For example, in one embodiment such means include, means for injecting a common mode signal probe onto a first end of a Digital Subscriber Line (DSL line); means for measuring impedance of the common mode signal probe on the DSL line at the first end of the DSL line; means for detecting an impedance anomaly on the DSL line based on the measured impedance of the common mode signal probe; and means for correlating the impedance anomaly on the DSL line to a boundary condition on the DSL line.

40 Claims, 22 Drawing Sheets

(51) Int. Cl.
*H04M 3/26* (2006.01)
*H04M 3/30* (2006.01)
*H04M 11/06* (2006.01)

(56) References Cited

U.S. PATENT DOCUMENTS

| | | | |
|---|---|---|---|
| 7,012,991 B1* | 3/2006 | Faulkner | 379/1.04 |
| 2002/0067802 A1 | 6/2002 | Smith et al. | |
| 2003/0076930 A1* | 4/2003 | Lu et al. | 379/1.04 |
| 2006/0098725 A1* | 5/2006 | Rhee et al. | 375/222 |
| 2009/0168972 A1* | 7/2009 | Cioffi | H04M 3/304 379/1.04 |
| 2010/0271039 A1 | 10/2010 | Durston et al. | |

OTHER PUBLICATIONS

International Preliminary Report on Patentability for International Patent Application No. PCT/US2012/028783, dated Sep. 25, 2014, 5 pages.

* cited by examiner

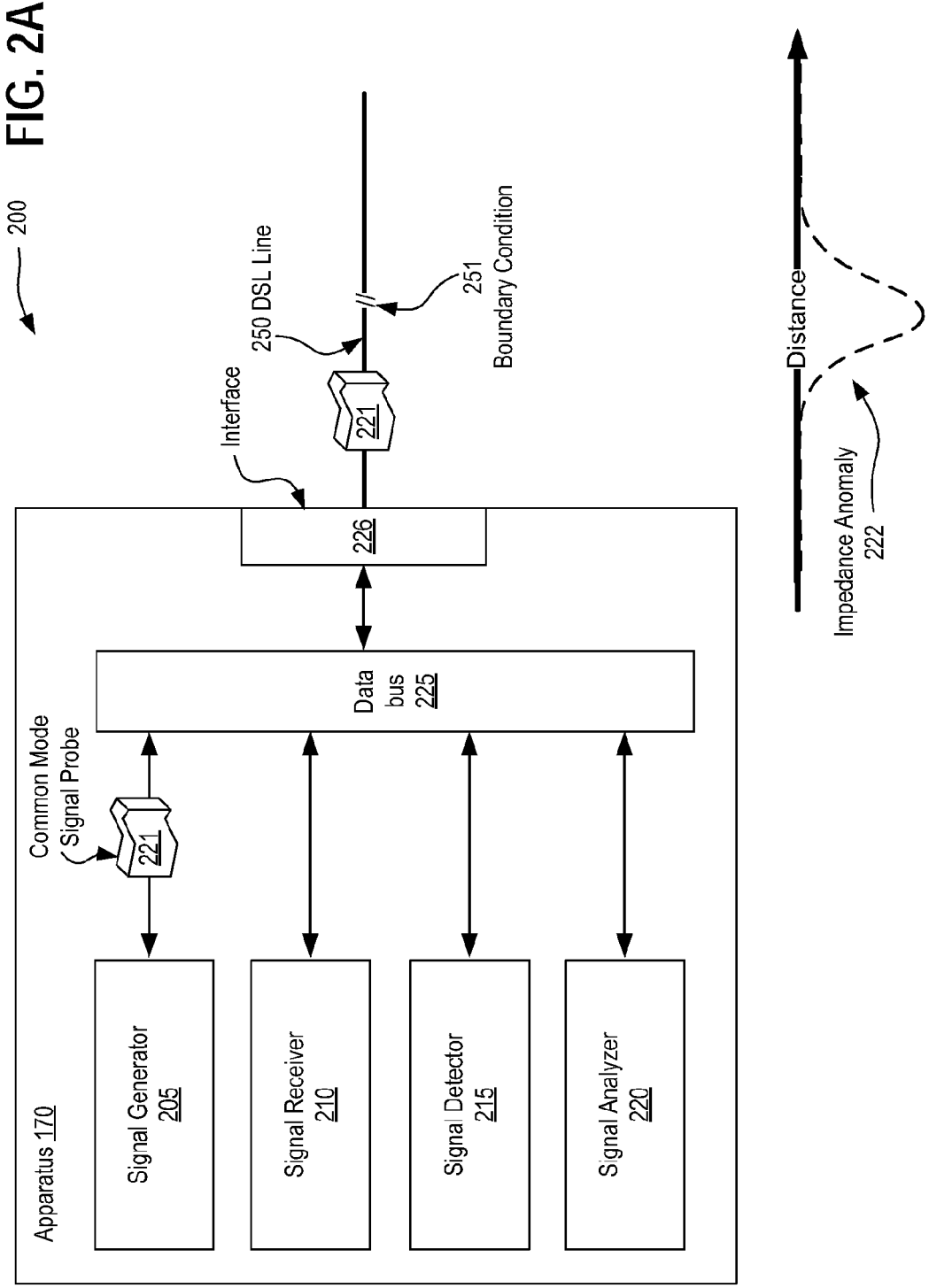

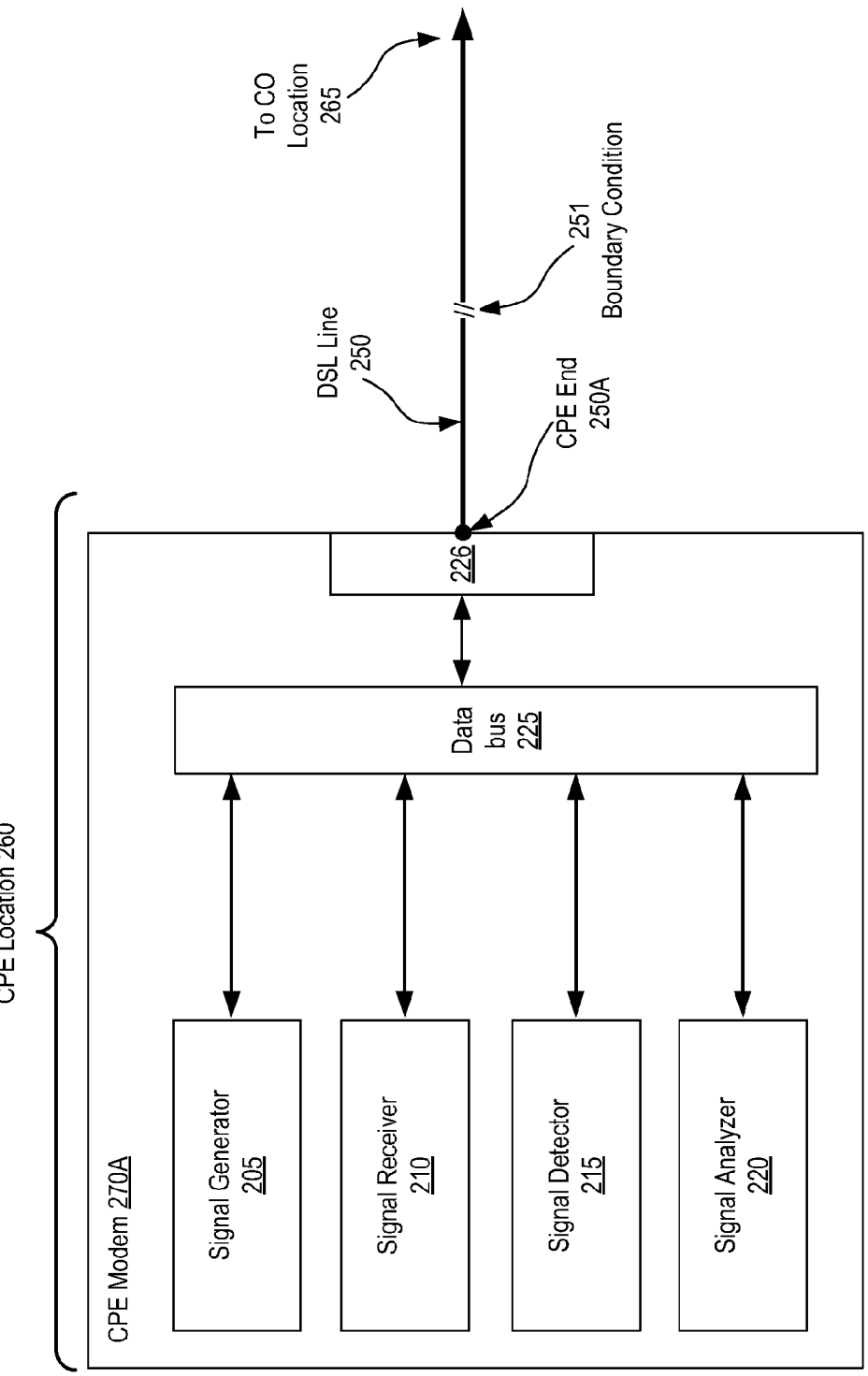

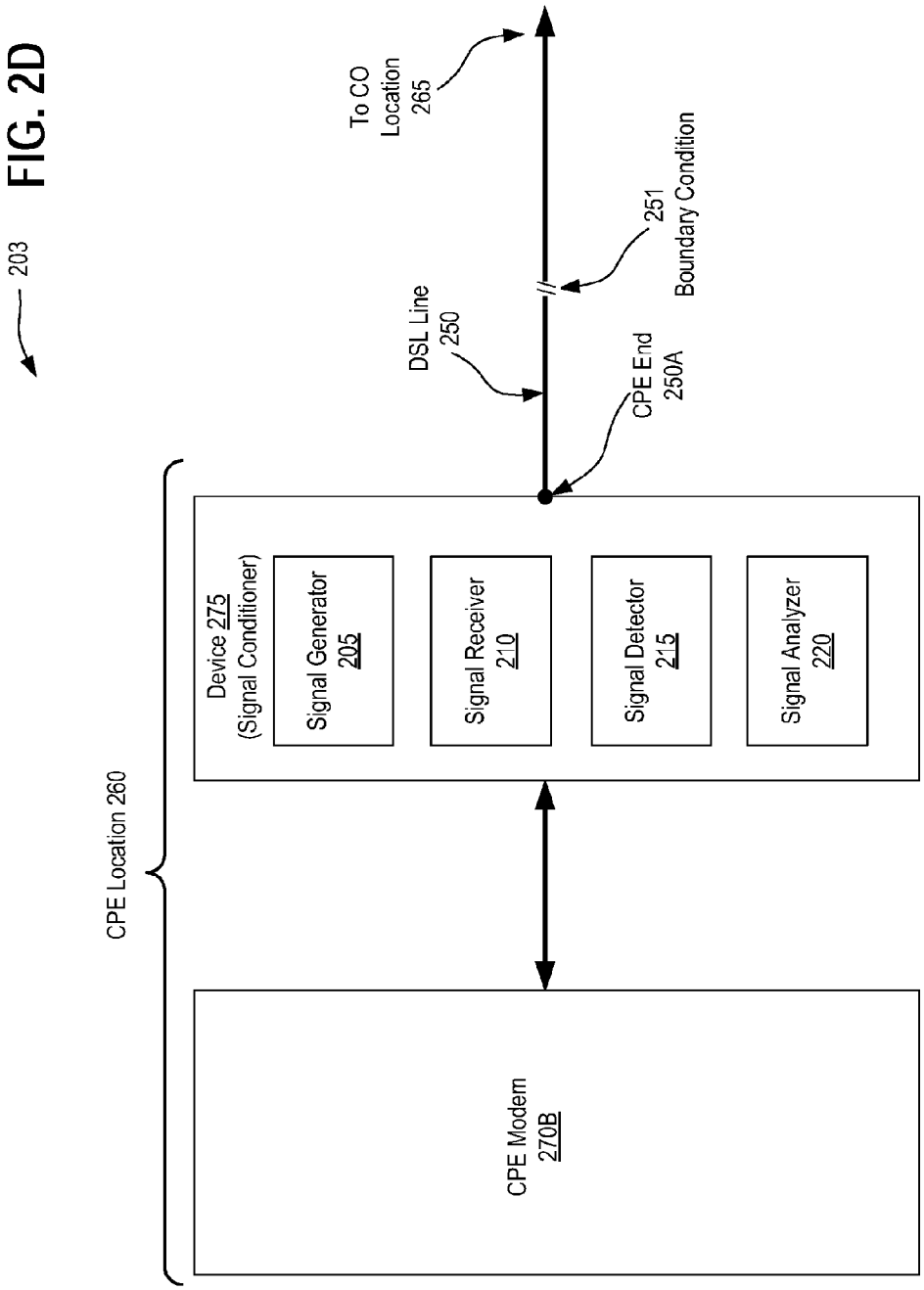

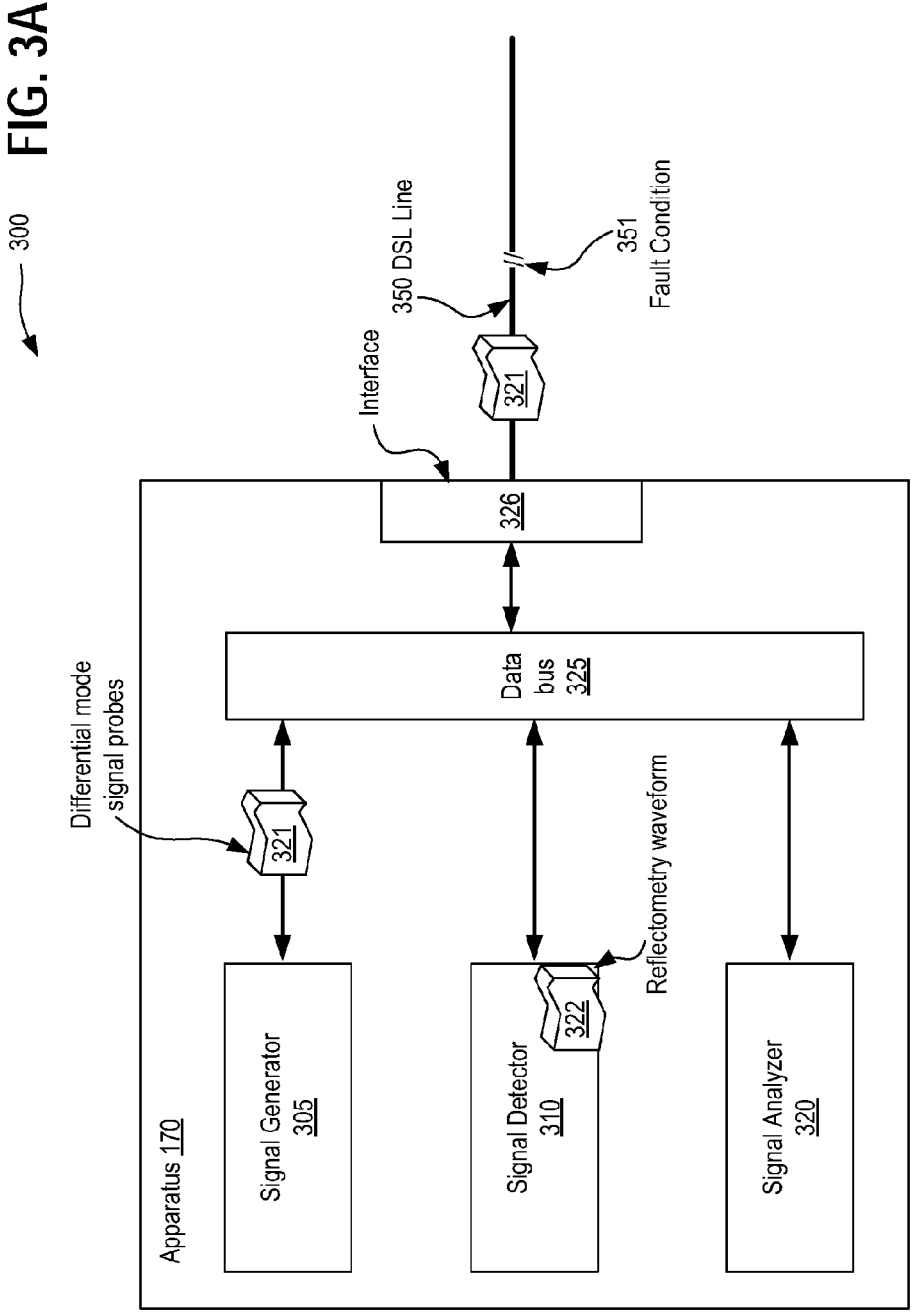

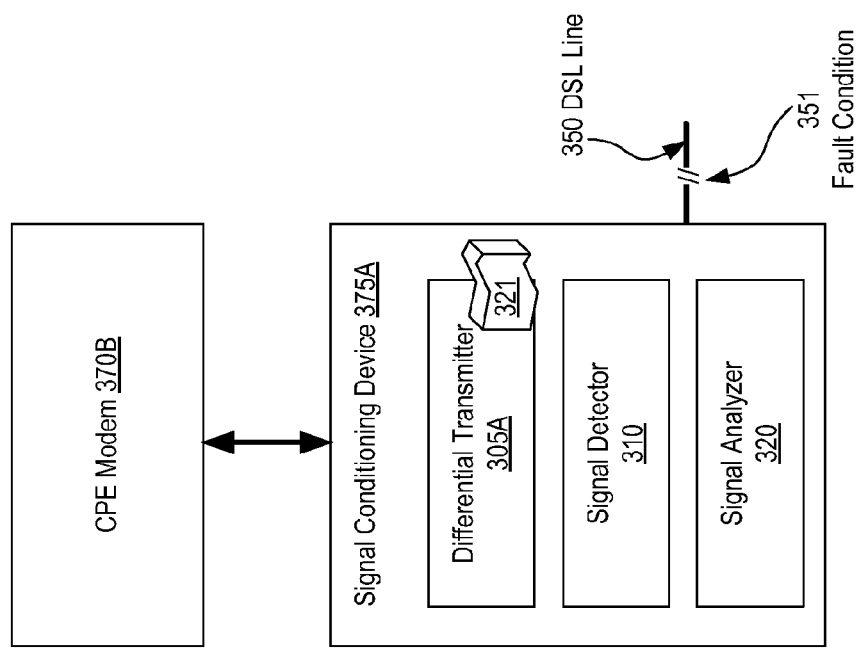

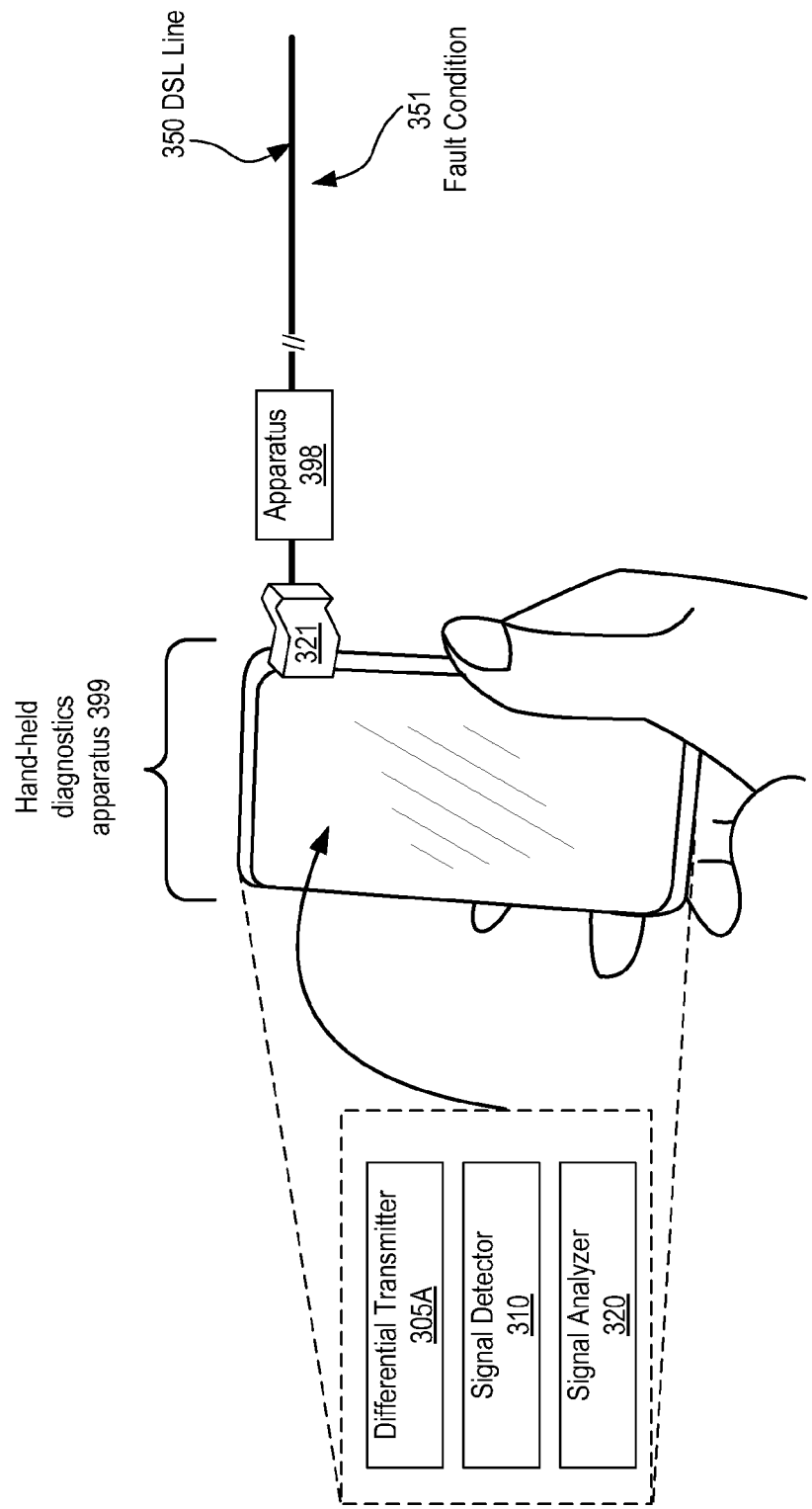

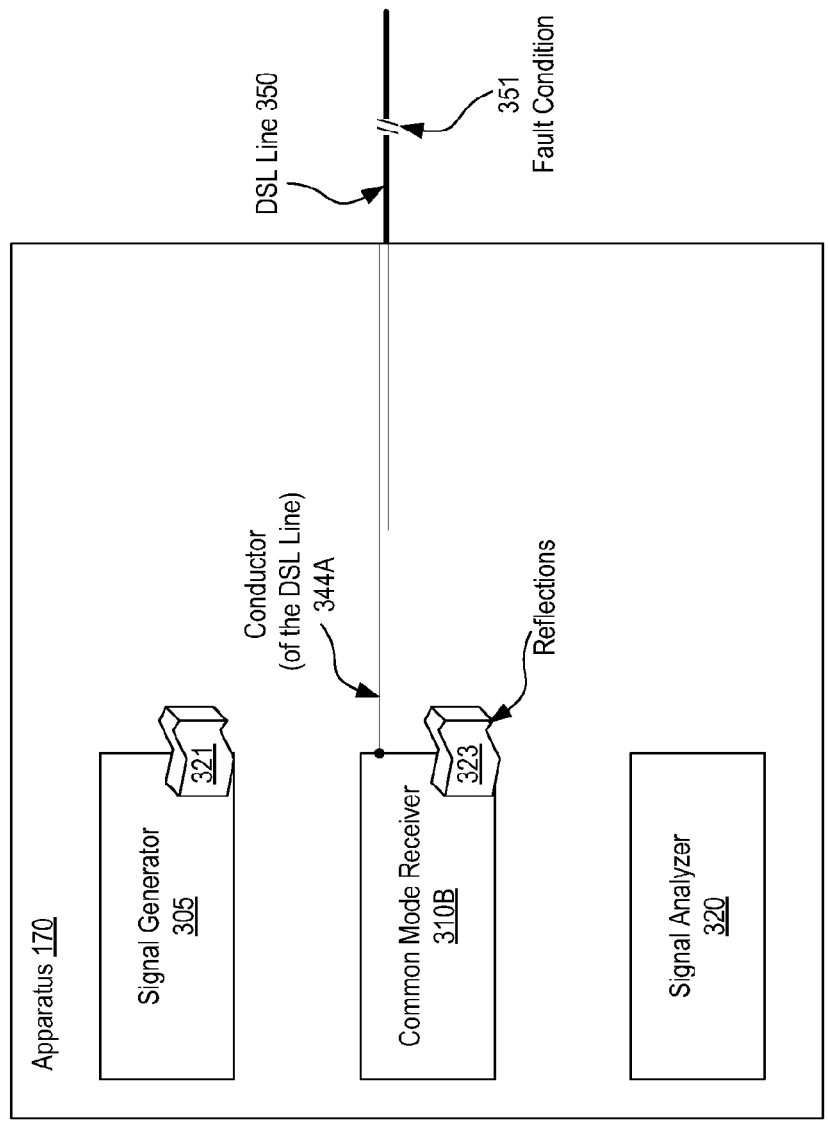

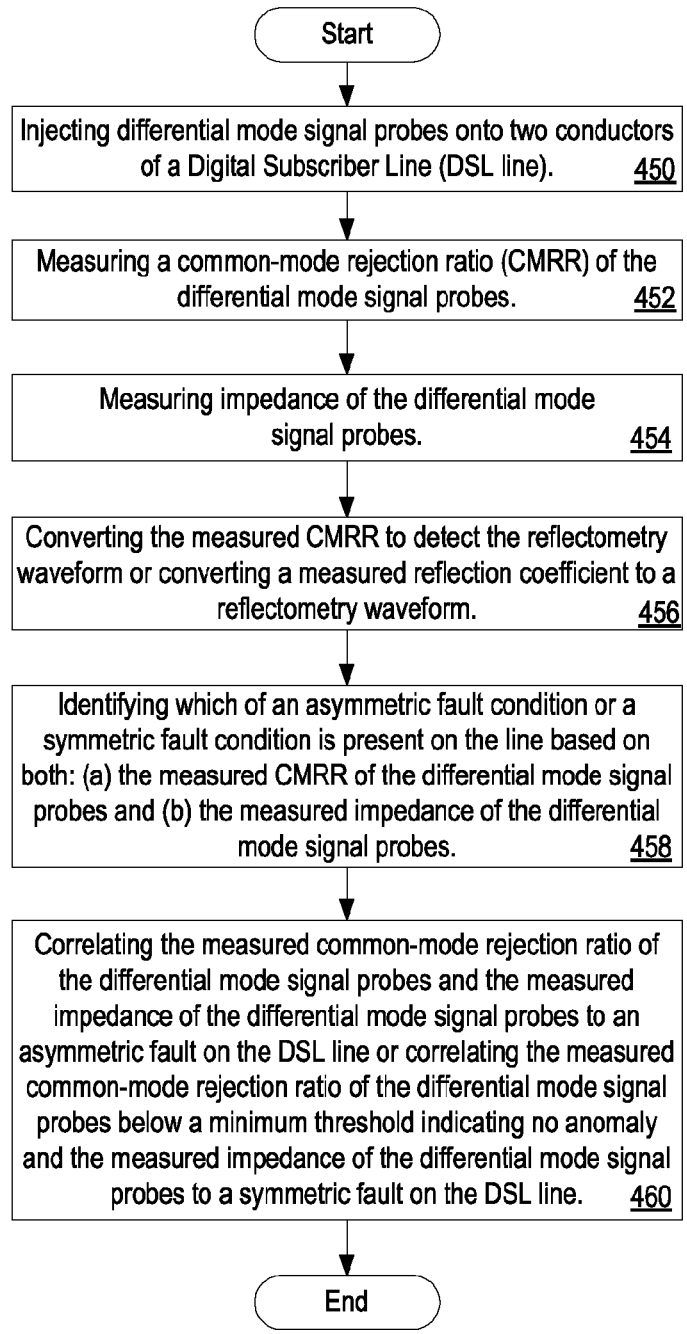

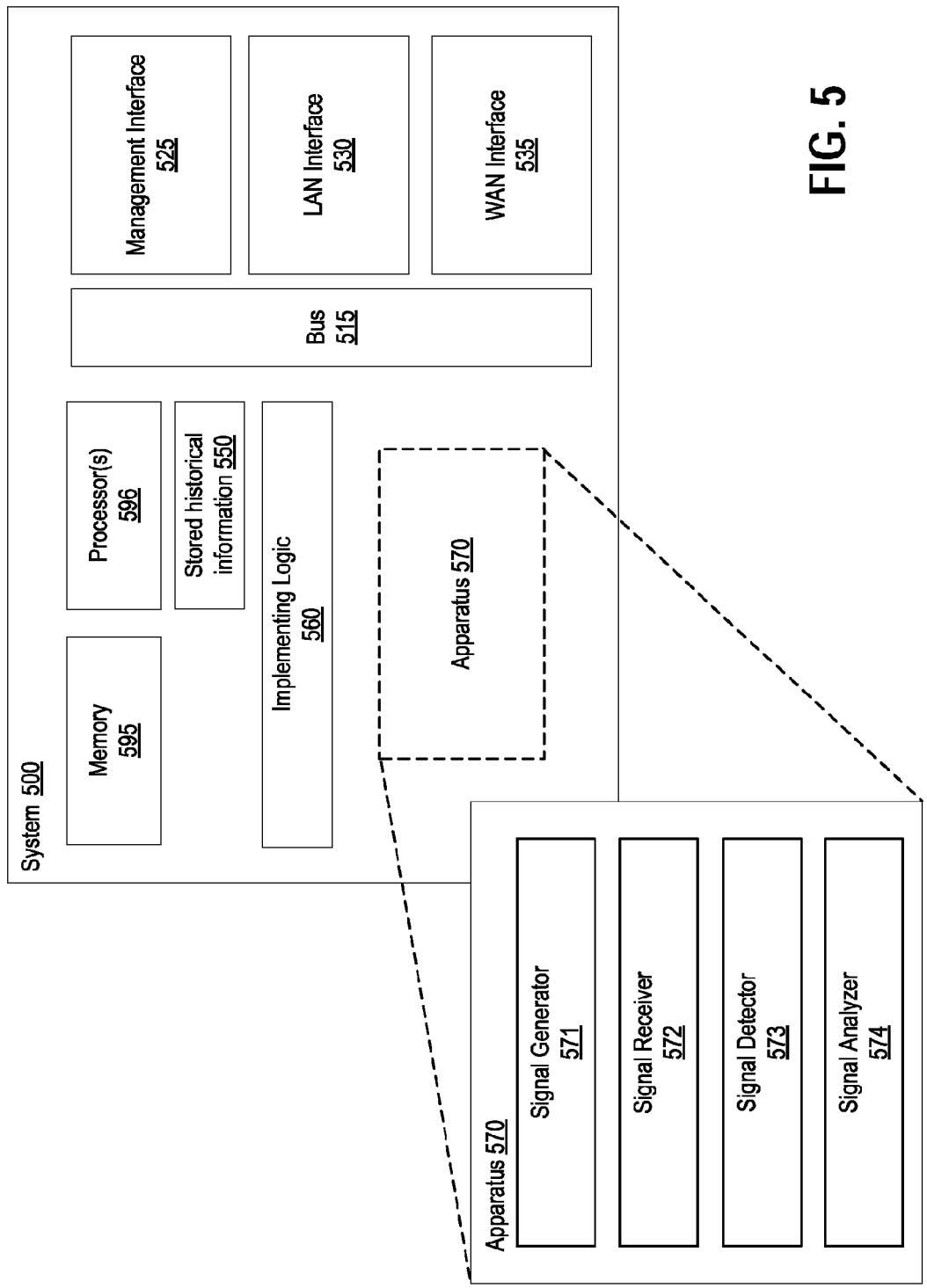

APPARATUS, SYSTEMS AND METHODS OF COMMON MODE BASED DIAGNOSTICS

CLAIM OF PRIORITY

This application is a U.S. National Phase application under U.S.C. §371 of International Application No. PCT/US2012/028783, filed Mar. 12, 2012, entitled "APPARATUS, SYSTEMS AND METHODS OF COMMON MODE BASED DIAGNOSTICS", the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to apparatus, systems and methods for detecting a boundary condition via common mode diagnostics; and to apparatus, systems and methods for detecting a fault condition via common-mode rejection ratio diagnostics.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

The "Internet" is a Wide Area Network that joins together many other networks, providing a communications path between devices operating within distinct and often geographically dispersed networks. A Local Area Network (LAN) enables multiple distinct devices within an end-user's premises to communicate amongst themselves locally. An end-user's LAN is often connected to the Internet via a WAN backhaul connection to an Internet Service Provider (ISP) that provides the end-user consumer with Internet connectivity and Internet Bandwidth. WAN backhaul technologies include DSL, cable modems, fiber, and wireless. Devices within the end-user's LAN may communicate with devices external to the LAN over the WAN backhaul connection provided by the end-user's ISP.

Traditionally, the WAN is controlled, managed and maintained by service providers, such as Internet Service Providers, Telecommunications Operators, etc. When faults occur, service technicians are dispatched to diagnose and repair the fault condition. Unfortunately, conventional diagnosis techniques require sending a kill signal to a customer's modem thus interrupting service. Additionally, conventional diagnosis techniques do not provide sufficient detail to enable efficient diagnosis and repair of a fault condition, such as a geographical location of a fault and the type of a fault.

The present state of the art may therefore benefit from apparatuses, systems and methods for detecting a boundary condition via common mode diagnostics; and apparatuses, systems and methods for detecting a fault condition via common-mode rejection ratio diagnostics, all of which are described herein.

BRIEF DESCRIPTION OF THE DRAWINGS

Embodiments are illustrated by way of example, and not by way of limitation, and will be more fully understood with reference to the following detailed description when considered in connection with the figures in which:

FIGS. 2A, 2B, 2C, 2D, 2E, 2F, 2G, and 2H illustrate alternative exemplary architectures in which embodiments may operate;

FIGS. 3A, 3B, 3C, 3D, 3E, 3F, 3G, 3H, 3I, and 3J illustrate alternative exemplary architectures in accordance with which embodiments may operate;

FIGS. 4A and 4B are flow diagrams illustrating methods for detecting a boundary condition via common mode diagnostics and methods for detecting a fault condition via common-mode rejection ratio diagnostics in accordance with described embodiments;

FIG. 5 shows a diagrammatic representation of a system in accordance with which embodiments may operate, be installed, integrated, or configured.

DETAILED DESCRIPTION

Figure 1:
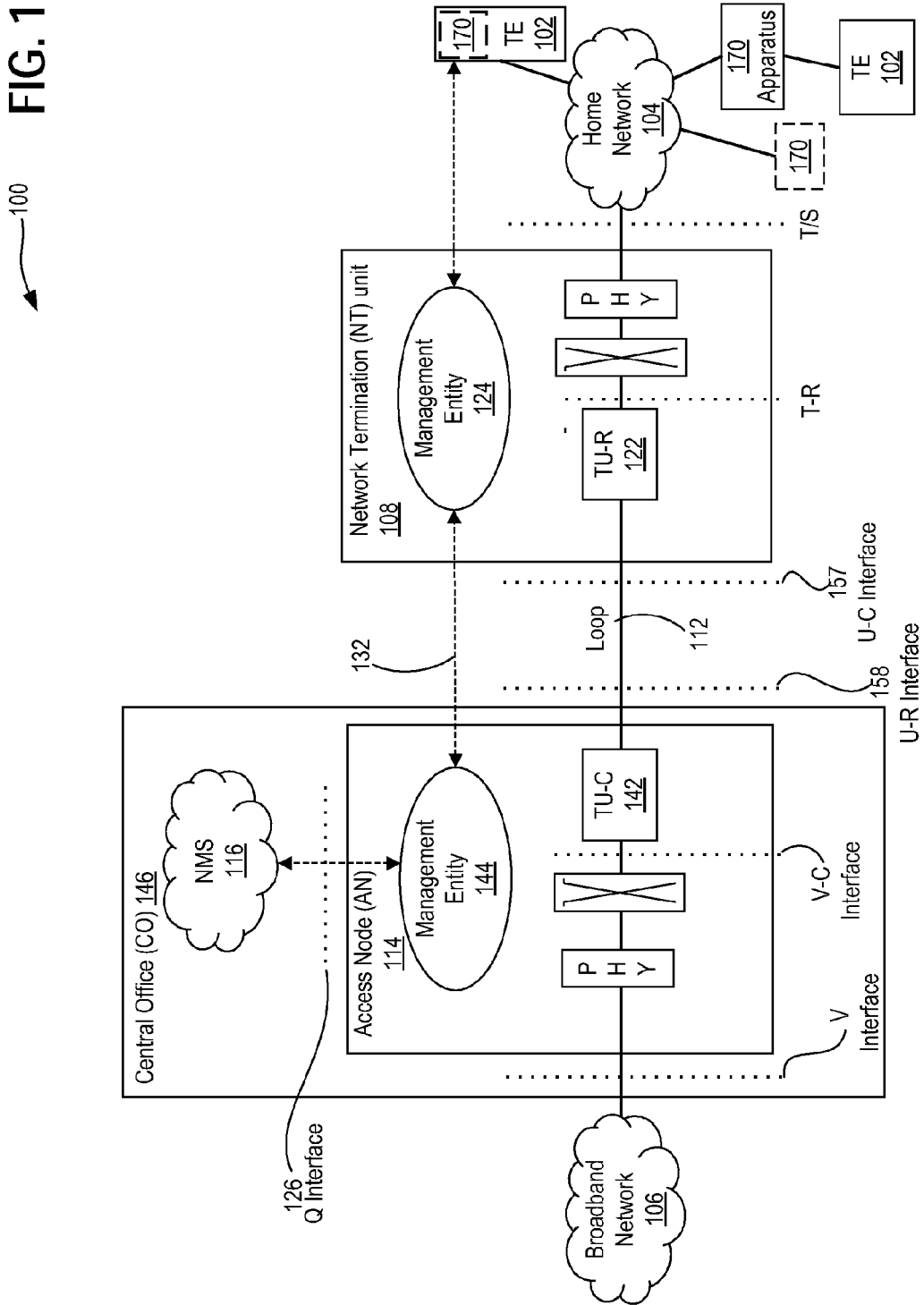
FIG. 1 illustrates an exemplary architecture in which embodiments may operate.

Described herein are apparatus, systems and methods for detecting a boundary condition via common mode diagnostics; and to apparatus, systems and methods for detecting a fault condition via common-mode rejection ratio diagnostics.

In accordance with one embodiment, means for detecting a boundary condition via common mode diagnostics are disclosed. Such means may include, for example, means for injecting a common mode signal probe onto a first end of a Digital Subscriber Line (DSL line); means for measuring impedance of the common mode signal probe on the DSL line at the first end of the DSL line; means for detecting an impedance anomaly on the DSL line based on the measured impedance of the common mode signal probe; and means for correlating the impedance anomaly on the DSL line to a boundary condition on the DSL line.

In accordance with another embodiment, means for detecting a fault condition via common-mode rejection ratio diagnostics are disclosed. Such means may include, for example, means for injecting differential mode signal probes onto two conductors of a Digital Subscriber Line (DSL line); means for measuring a common-mode rejection ratio (CMRR) of the differential mode signal probes; means for measuring impedance of the differential mode signal probes; and means for identifying which of an asymmetric fault condition or a symmetric fault condition is present on the line based on both: (a) the measured CMRR of the differential mode signal probes and (b) the measured impedance of the differential mode signal probes.

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software, including software instructions that perform the operations described herein via memory and one or more processors of a computing platform.

Embodiments also relate to a system or apparatus for performing the operations herein. The disclosed system or apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, flash, NAND, solid state drives (SSDs), CD-ROMs, and magnetic-optical disks, read-only memories (ROMs), random access memories (RAMs), EPROMs, EEPROMs, magnetic or optical cards, or any type of media suitable for storing non-transitory electronic instructions, each coupled to a computer system bus. In one embodiment, a non-transitory computer readable storage medium having instructions stored thereon, causes one or more processors within an apparatus to perform the methods and operations which are described herein. In another embodiment, the instructions to perform such methods and operations are stored upon a non-transitory computer readable medium for later execution.

The algorithms and displays presented herein are not inherently related to any particular computer or other apparatus nor are embodiments described with reference to any particular programming language. It will be appreciated that a variety of programming languages may be used to implement the teachings of the embodiments as described herein.

FIG. 1 illustrates an exemplary architecture 100 in which embodiments may operate. Asymmetric Digital Subscriber Line (ADSL) systems (one form of Digital Subscriber Line (DSL) systems), which may or may not include splitters, operate in compliance with the various applicable standards such as ADSL1 (G.992.1), ADSL-Lite (G.992.2), ADSL2 (G.992.3), ADSL2-Lite G.992.4, ADSL2+(G.992.5) and the G.993.x emerging Very-high-speed Digital Subscriber Line or Very-high-bitrate Digital Subscriber Line (VDSL) standards, as well as the G.991.1 and G.991.2 Single-Pair High-speed Digital Subscriber Line (SHDSL) standards, all with and without bonding, and/or the G.997.1 standard (also known as G.ploam).

In accordance with embodiments described herein, end-user consumers, including residential consumers and business consumers, may connect to the Internet by way of a Wide Area Network (WAN) backhaul connection to a Service Provider (SP), such as an Internet Service Provider (ISP), or to a Service Provider that provides one or more of data connectivity, voice connectivity, video connectivity, and mobile device connectivity to a plurality of subscribers. Such Service Providers may include a Digital Subscriber Line (DSL) internet service provider which provides its subscribing end-users with Internet bandwidth at least partially over copper twisted pair telephone lines, such as that conventionally utilized to carry analog telephone service (e.g., Plain Old Telephone Service (POTS); a coaxial cable internet service provider which provides end-users with Internet bandwidth at least partially over coaxial cable, such as that conventionally utilized to carry "cable" television signals; or a fiber optics internet service provider which provides end-users with Internet bandwidth at over fiber optic cable that terminates at a customer's premises. Other variants exist as well, such as ISPs which provide Internet bandwidth as an analog signal over an analog telephone based connection, ISPs that provide Internet bandwidth over a one-way or two-way satellite connection, and ISPs that provide Internet bandwidth at least partially over power lines, such as power lines conventionally utilized to transmit utility power (e.g., electricity) to an end-user's premises, or ISPs that provide Internet bandwidth at least partially over wireless channels, such as wireless (e.g., WiFi) connectivity at hotspots, or mobile data connectivity via technologies and standards such as WiMax, 3G/4G, LTE, etc.

In performing the disclosed functions, systems may utilize a variety of operational data (which includes performance data) that is available at an Access Node (AN).

In FIG. 1, user's terminal equipment 102 (e.g., a Customer Premises Equipment (CPE) device or a remote terminal device, network node, LAN device, etc.) is coupled to a home network 104, which in turn is coupled to a Network Termination (NT) Unit 108. DSL Transceiver Units (TU) are further depicted (e.g., a device that provides modulation on a DSL loop or line). In one embodiment, NT unit 108 includes a TU-R (TU Remote), 122 (for example, a transceiver defined by one of the ADSL or VDSL standards) or any other suitable network termination modem, transceiver or other communication unit. NT unit 108 also includes a Management Entity (ME) 124. Management Entity 124 can be any suitable hardware device, such as a microprocessor, microcontroller, or circuit state machine in firmware or hardware, capable of performing as required by any applicable standards and/or other criteria. Management Entity 124 collects and stores, among other things, operational data in its Management Information Base (MIB), which is a database of information maintained by each ME capable of being accessed via network management protocols such as Simple Network Management Protocol (SNMP), an administration protocol used to gather information from a network device to provide to an administrator console/program or via Transaction Language 1 (TL1) commands, TL1 being a long-established command language used to program responses and commands between telecommunication network elements.

Each TU-R 122 in a system may be coupled with a TU-C (TU Central) in a Central Office (CO) or other central location. TU-C 142 is located at an Access Node (AN) 114 in Central Office 146. A Management Entity 144 likewise maintains an MIB of operational data pertaining to TU-C 142. The Access Node 114 may be coupled to a broadband network 106 or other network, as will be appreciated by those skilled in the art. TU-R 122 and TU-C 142 are coupled together by a loop 112, which in the case of ADSL may be a twisted pair line, such as a telephone line, which may carry other communication services besides DSL based communications.

Several of the interfaces shown in FIG. 1 are used for determining and collecting operational data. The Q interface 126 provides the interface between the Network Management System (NMS) 116 of the operator and ME 144 in Access Node 114. Parameters specified in the G.997.1 standard apply at the Q interface 126. The near-end parameters supported in Management Entity 144 may be derived from TU-C 142, while far-end parameters from TU-R 122 may be derived by either of two interfaces over the UA interface. Indicator bits and EOC messages may be sent using embedded channel 132 and provided at the Physical Medium Dependent (PMD) layer, and may be used to generate the required TU-R 122 parameters in ME 144. Alternately, the Operations, Administration and Maintenance (OAM) channel and a suitable protocol may be used to retrieve the parameters from TU-R 122 when requested by Management Entity 144. Similarly, the far-end parameters from TU-C 142 may be derived by either of two interfaces over the U-interface. Indicator bits and EOC message provided at the PMD layer may be used to generate the required TU-C 142 parameters in Management Entity 124 of NT unit 108. Alternately, the OAM channel and a suitable protocol may be used to retrieve the parameters from TU-C 142 when requested by Management Entity 124.

At the U interface (also referred to as loop 112), there are two management interfaces, one at TU-C 142 (the U-C interface 157) and one at TU-R 122 (the U-R interface 158). Interface 157 provides TU-C near-end parameters for TU-R 122 to retrieve over the U interface/loop 112. Similarly, U-R interface 158 provides TU-R near-end parameters for TU-C 142 to retrieve over the U interface/loop 112. The parameters that apply may be dependent upon the transceiver standard being used (for example, G.992.1 or G.992.2). The G.997.1 standard specifies an optional Operation, Administration, and Maintenance (OAM) communication channel across the U interface. If this channel is implemented, TU-C and TU-R pairs may use it for transporting physical layer OAM messages. Thus, the TU transceivers 122 and 142 of such a system share various operational data maintained in their respective MIBs.

Depicted within FIG. 1 is apparatus 170 operating at various optional locations in accordance with several alternative embodiments. For example, in accordance with one embodiment, apparatus 170 is located within home network 104, such as within a LAN. In one embodiment apparatus 170 operates as a DSL modem, such as a Customer Premises (CPE) modem. In another embodiment, apparatus 170 operates as a controller card or as a chipset within a user's terminal equipment 102 (e.g., a Customer Premises Equipment (CPE) device or a remote terminal device, network node, LAN device, etc.) coupled to the home network 104 as depicted. In another embodiment, apparatus 170 operates as a separate and physically distinct stand alone unit which is connected between the user's terminal equipment 102 and a DSL line or loop. For example, apparatus 170 may operate as a stand-alone signal conditioning device.

As used herein, the terms "user," "subscriber," and/or "customer" refer to a person, business and/or organization to which communication services and/or equipment are and/or may potentially be provided by any of a variety of service provider(s). Further, the term "customer premises" refers to the location to which communication services are being provided by a service provider. For an example Public Switched Telephone Network (PSTN) used to provide DSL services, customer premises are located at, near and/or are associated with the network termination (NT) side of the telephone lines. Example customer premises include a residence or an office building.

As used herein, the term "service provider" refers to any of a variety of entities that provide, sell, provision, troubleshoot and/or maintain communication services and/or communication equipment. Example service providers include a telephone operating company, a cable operating company, a wireless operating company, an internet service provider, or any service that may independently or in conjunction with a broadband communications service provider offer services that diagnose or improve broadband communications services (DSL, DSL services, cable, etc.).

Additionally, as used herein, the term "DSL" refers to any of a variety and/or variant of DSL technology such as, for example, Asymmetric DSL (ADSL), High-speed DSL (HDSL), Symmetric DSL (SDSL), and/or Very high-speed/Very high-bit-rate DSL (VDSL). Such DSL technologies are commonly implemented in accordance with an applicable standard such as, for example, the International Telecommunications Union (I.T.U.) standard G.992.1 (a.k.a. G.dmt) for ADSL modems, the I.T.U. standard G.992.3 (a.k.a. G.dmt.bis, or G.adsl2) for ADSL2 modems, I.T.U. standard G.992.5 (a.k.a. G.adsl2plus) for ADSL2+ modems, I.T.U. standard G.993.1 (a.k.a. G.vdsl) for VDSL modems, I.T.U. standard G.993.2 for VDSL2 modems, I.T.U. standard G.994.1 (G.hs) for modems implementing handshake, and/or the I.T.U. G.997.1 (a.k.a. G.ploam) standard for management of DSL modems.

References to connecting a DSL modem and/or a DSL communication service to a customer are made with respect to exemplary Digital Subscriber Line (DSL) equipment, DSL services, DSL systems and/or the use of ordinary twisted-pair copper telephone lines for distribution of DSL services and it shall be understood that the disclosed methods and apparatus to characterize and/or test a transmission medium for communication systems disclosed herein may be applied to many other types and/or variety of communication equipment, services, technologies and/or systems. For example, other types of systems include wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, broadband power-line systems and/or fiber optic networks. Additionally, combinations of these devices, systems and/or networks may also be used. For example, a combination of twisted-pair and coaxial cable interfaced via a balun connector, or any other physical-channel-continuing combination such as an analog fiber to copper connection with linear optical-to-electrical connection at an Optical Network Unit (ONU) may be used.

The phrases "coupled to," "coupled with," "connected to," "connected with" and the like are used herein to describe a connection between two elements and/or components and are intended to mean coupled/connected either directly together, or indirectly, for example via one or more intervening elements or via a wired/wireless connection. References to a "communication system" are intended, where applicable, to include reference to any other type of data transmission system.

FIG. 2A illustrates an alternative exemplary architecture 200 in which embodiments may operate. FIG. 2A depicts an apparatus 170 which is communicably interfaced to a first end of a DSL line 250, for example, through an interface 226 of the apparatus. Apparatus 170 includes several components which are interconnected through a data bus 225.

In accordance with one embodiment, apparatus 170 includes: a signal generator 205 to inject a common mode signal probe 221 onto a first end of a Digital Subscriber Line (DSL line) 250; a signal receiver 210 to measure impedance of the common mode signal probe 221 on the DSL line 250 at the first end of the DSL line 250; a signal detector 215 to detect an impedance anomaly 222 on the DSL line 250 based on the measured impedance of the common mode signal probe 221; and a signal analyzer 220 to correlate the impedance anomaly 222 on the DSL line 250 to a boundary condition 251 on the DSL line 250.

Apparatus 170 may be implemented and utilized in a variety of forms. For example, in one embodiment, the apparatus 170 is a chipset of a Customer Premises Equipment (CPE) modem communicably interfaced with the first end of the DSL line 250 to inject the generated probe onto the DSL line 250. In another embodiment, the apparatus 170 is a chipset of a signal conditioning device physically separate and distinct from a Customer Premises Equipment (CPE) modem, in which the CPE modem is communicably interfaced with the first end of the DSL line 250 through the signal conditioning device which is communicatively interfaced to the DSL line 250. In such an embodiment, such a signal conditioning device may inject the generated probe onto the DSL line 250 without the involvement or participation of the CPE modem. In yet another embodiment, the apparatus 170 is a controller card configured within a Customer Premises Equipment (CPE) modem communicably interfaced with the first end of the DSL line 250 to inject the generated probe from the controller card via the CPE modem onto the DSL line 250. In one embodiment, the apparatus 170 is a controller card configured within a signal conditioning device physically separate and distinct from a Customer Premises Equipment (CPE) modem, in which the signal conditioning device is communicatively interfaced with the first end of the DSL line 250 and in which the CPE modem is interfaced to the DSL line 250 through the signal conditioning device. In such an embodiment, the controller card of the signal conditioning device injects the generated probe onto the DSL line 250. In another embodiment, the apparatus 170 is a hand-held diagnostics apparatus 170 temporarily connected with the first end of the DSL line 250 to inject the generated probe via the hand-held diagnostics apparatus 170 onto the first end of the DSL line 250. Alternatively, the hand-held diagnostics apparatus 170 may utilize the CPE modem, the controller card, or the signal conditioning device to inject the generated probe.

In accordance with one embodiment, the signal receiver 210 measures the impedance of the common mode signal probe 221 on the DSL line 250 by measuring a reflection coefficient of the common mode signal probe 221 at the first end of the DSL line 250. In such an embodiment, the signal detector 215 detects the impedance anomaly on the DSL line 250 by detecting a change in the impedance of the DSL line 250 based on the measured reflection coefficient.

Figure 2B:
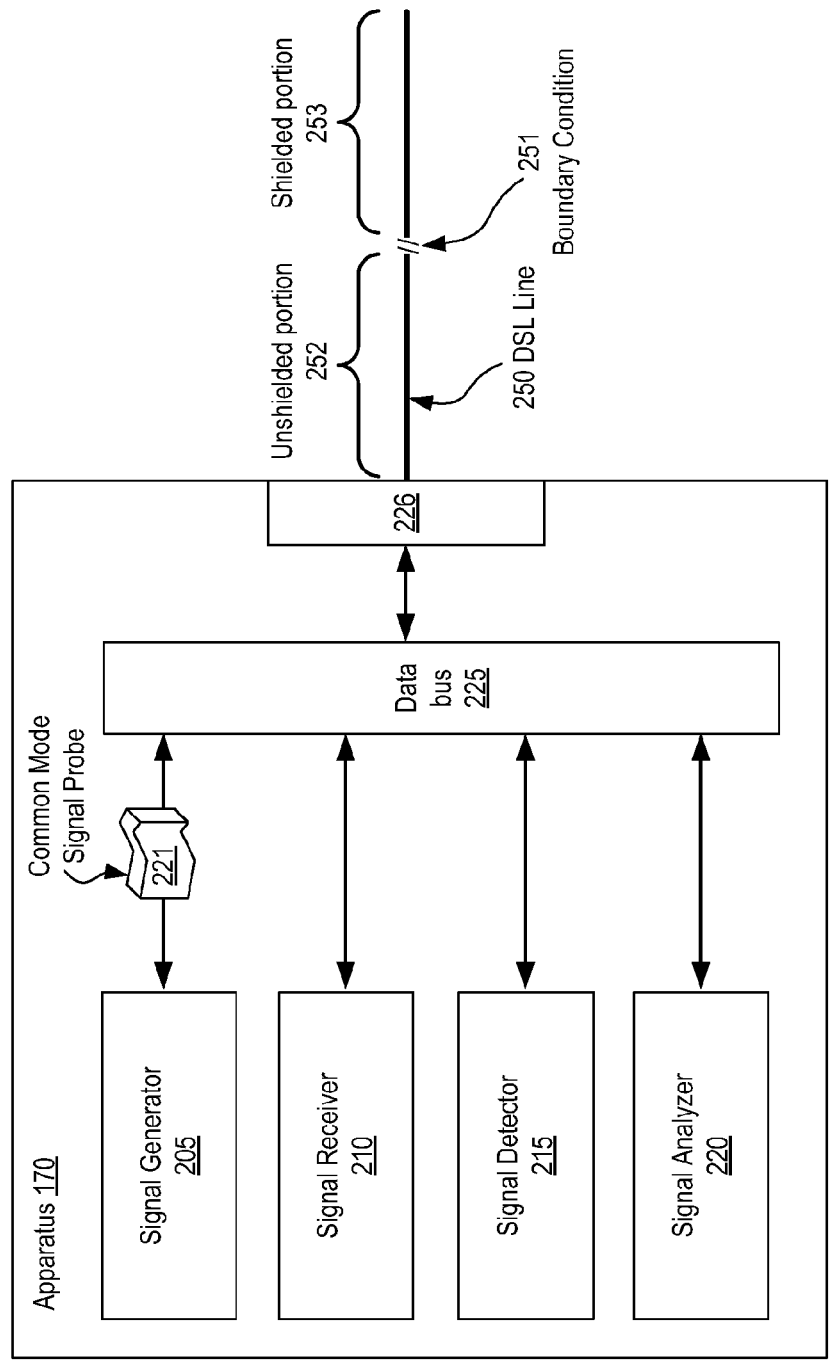

FIG. 2B illustrates an alternative exemplary architecture 201 in which embodiments may operate. FIG. 2B depicts the apparatus 170 which is communicably interfaced to a first end of a DSL line 250 in which both an unshielded portion 252 and a shielded portion 253 are depicted separated by the boundary condition 251, also referred to as a boundary or a boundary location.

Thus, in accordance with one embodiment, the signal analyzer 220 correlates the impedance anomaly on the DSL line 250 to a boundary (e.g., corresponding to the boundary condition 251) separating an unshielded portion 252 of the DSL line 250 from a shielded portion 253 of the DSL line 250.

In one embodiment, the signal detector 215 detects the impedance anomaly on the DSL line 250 by detecting a change in permittivity coincident with a boundary location (e.g., corresponding to the boundary condition 251) separating the unshielded portion 252 of the DSL line 250 from the shielded portion 253 of the DSL line 250. In such an embodiment, a first measured permittivity for the shielded portion 253 of the DSL line 250 is consistent with a shielding material and a second measured permittivity for the unshielded portion 252 of the DSL line 250 is consistent with an air space between a conductor of the DSL line 250 and a ground of the DSL line 250. Such shielding material may be, for example, Polyvinyl chloride (PVC) shielding having a permittivity in the range of approximately 2.5 to 3.0 or may be constructed from alternate shielding material, such as paper which is common in Japan. Permittivity of the air space between a conductor of the DSL line 250 and a ground of the DSL line 250 will typically be measured at approximately 1.0 regardless of whether the air space is a large space between the conductor and a terrestrial ground or a small air space between the conductor and a conduit housing the DSL line 250, for example, in a sub-terrestrial environment.

FIG. 2C illustrates an alternative exemplary architecture 202 in which embodiments may operate. FIG. 2C depicts the apparatus 170 as a Customer Premises Equipment (CPE) modem 270A having a CPE end 250A of the DSL line 250 communicatively interfaced to a CO location 265.

In accordance with one embodiment, the common mode signal probe 221 includes a reflectometry pulse. In one embodiment, such a reflectometry pulse is generated via frequency-domain reflectometry, for example, by the signal generator 205.

In accordance with one embodiment, the first end of the DSL line 250 is a Customer Premises Equipment (CPE) end 250A of the DSL line 250 and the reflectometry pulse (e.g., as the common mode signal probe 221) is injected at the CPE end 250A of the DSL line 250. In one embodiment, the CPE modem 270A resides at a Customer Premises Equipment location (CPE location) 260 and is communicatively interfaced with equipment at a Central Office location (CO location) 265.

FIG. 2D illustrates an alternative exemplary architecture 203 in which embodiments may operate. FIG. 2D depicts the apparatus 170 as a device 275 separate and physically distinct from a CPE modem 270B.

Thus, in accordance with one embodiment, the reflectometry pulse (e.g., as the common mode signal probe 221) is injected via a device 275 at the CPE location 260 communicatively interfaced between the CPE modem and the DSL line 250. In such an embodiment, the device 275 at the CPE location 260 is a signal conditioning device which injects the reflectometry pulse. In such an embodiment, the signal conditioning device 275 optimizes signals transmitted to and from the CPE modem 270B.

In one embodiment, the device 275 at the CPE location 260 receives instructions to inject the reflectometry pulse, in which the instructions are received from an entity external to the device 275 and separate from the CPE modem 270B. For example, such instructions may be generated and transmitted from the CO location 265, by another entity communicatively interfaced with the device 275, or by a technician at the CPE location 260 utilizing diagnostics equipment to cause the device 275 to inject the common mode signal probe 221 or a reflectometry pulse onto the DSL line 250.

Figure 2E:
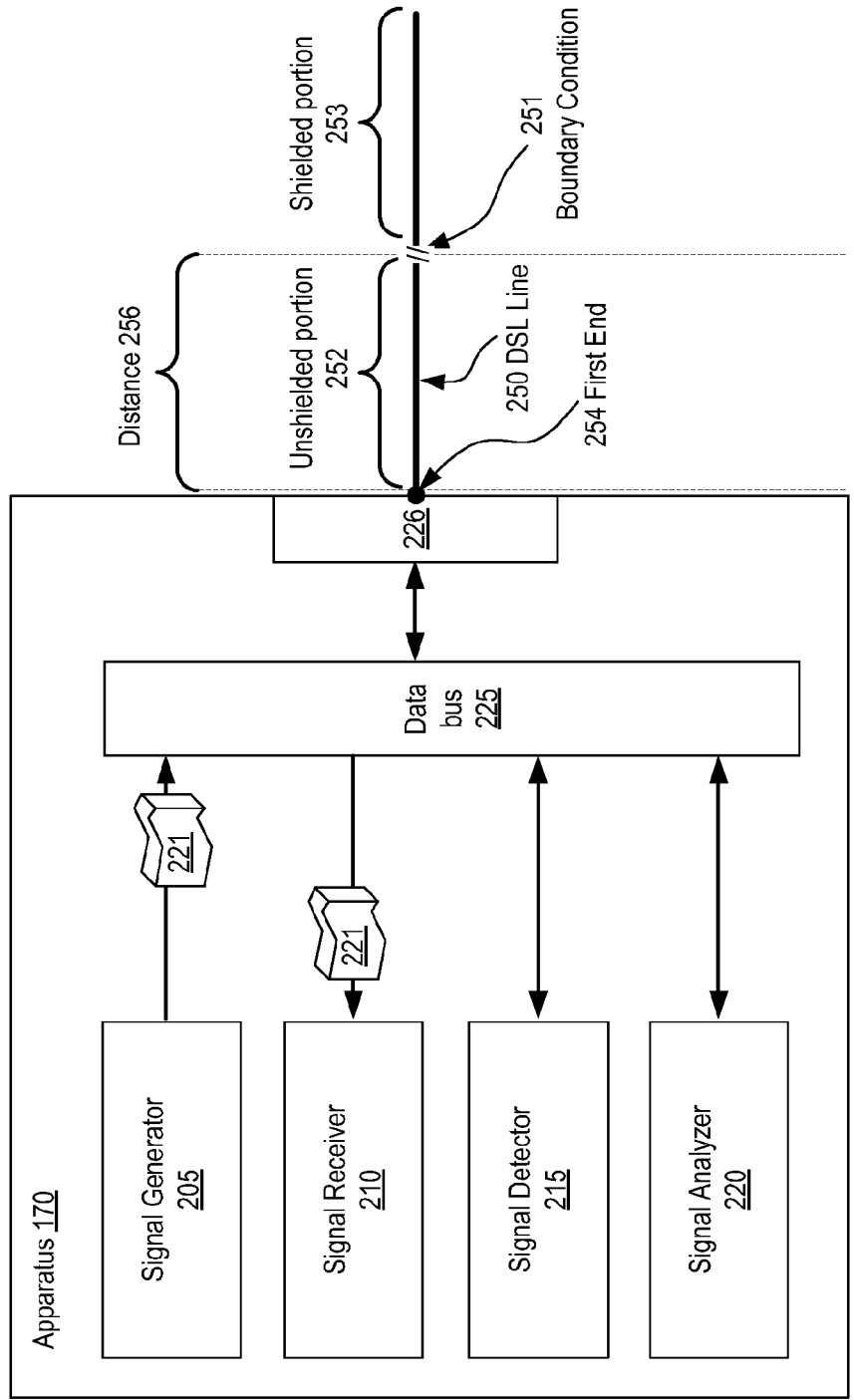

FIG. 2E illustrates an alternative exemplary architecture 204 in which embodiments may operate. FIG. 2E depicts the apparatus 170 at a first end 254 of the DSL line 250 and a distance 256 between the first end 254 and the boundary condition 251.

Thus, in accordance with one embodiment, the signal analyzer 220 correlates the impedance anomaly on the DSL line 250 to the boundary condition 251 on the DSL line 250 by correlating a time interval between the injection of the common mode signal probe 221 and the signal receiver 210 measuring the impedance of the common mode signal probe 221 to a distance 256 from the first end of the DSL line 250 to a boundary location on the DSL line 250.

In one embodiment, the distance 256 represents a length of the DSL line 250 between the first end 254 of the DSL line 250 and the boundary location (e.g., corresponding to boundary condition 251) on the DSL line 250 separating an unshielded portion 252 of the DSL line 250 from a shielded portion 253 of the DSL line 250 due to a discontinuity of the DSL line 250 at the boundary location. For example, such a discontinuity may result from a splice from an unshielded line originating at a customer location into a binder or a shielded line. In accordance with one embodiment, apparatus 170 correlates the distance 256 to the boundary location to a geographical location based on the distance 256 and based further on a known geographical route traversed by the DSL line 250. For example, where an entity, such a telecommunications operator knows a geographical route of the DSL line, a linear distance can be related to a geographical point or location. Such a geographical location will commonly, though not necessarily, coincide with a telephone pole or other common splice location where a technician is able to interface the DSL line originating from a customer's location to the DSL line which leads to the central office (CO).

In accordance with one embodiment, the apparatus 170 further generates a notification specifying an estimated distance 256 from a Customer Premises Equipment (CPE) modem connected with the first end 254 of the DSL line 250 and a boundary location derived from the boundary condition 251. In another embodiment, the apparatus 170 generates a notification indicating a fault at a boundary location derived from the boundary condition 251.

Figure 2F:
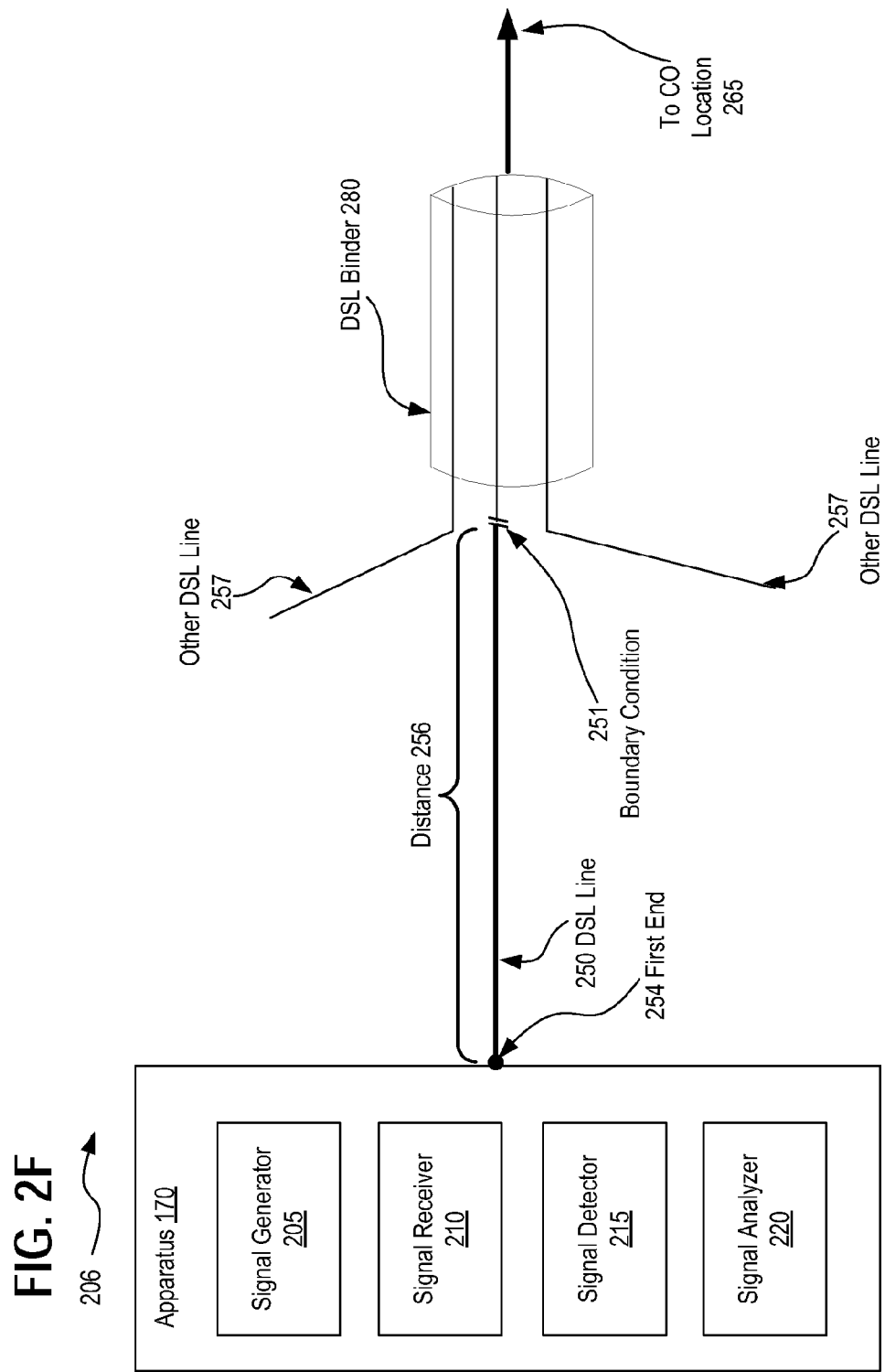

FIG. 2F illustrates an alternative exemplary architecture 206 in which embodiments may operate. FIG. 2F depicts the apparatus 170 at a first end 254 of the DSL line 250 in addition to a DSL binder 280 which leads to a CO location 265.

Thus, in accordance with one embodiment, the apparatus 170 indicates or describes the fault as a faulty splice at the boundary location (e.g., corresponding to or derived from the boundary condition 251) between the DSL line 250 and a DSL binder 280 having a plurality of additional or other DSL lines 257 therein, each in addition to the DSL line 250 interfaced to the apparatus 170.

In one embodiment, the apparatus 170 further generates a notification indicating a fault at a boundary location derived from the boundary condition 251 in which the fault is a faulty splice at the boundary location at or within the DSL binder 280 having the plurality of additional or other DSL lines 257 therein, in addition to the DSL line 250 interfaced to the apparatus 170.

In one embodiment, the apparatus 170 further generates a dispatch instruction to a boundary location derived from the boundary condition 251. In such an embodiment, the dispatch instruction specifies a geographical location of a telephone pole based on an estimated distance 256 between the first end 254 of the DSL line 250 and the boundary location. In one embodiment, the dispatch instruction further indicates a fault attributable to the DSL line 250 at the geographical location of a telephone pole.

Figure 2G:
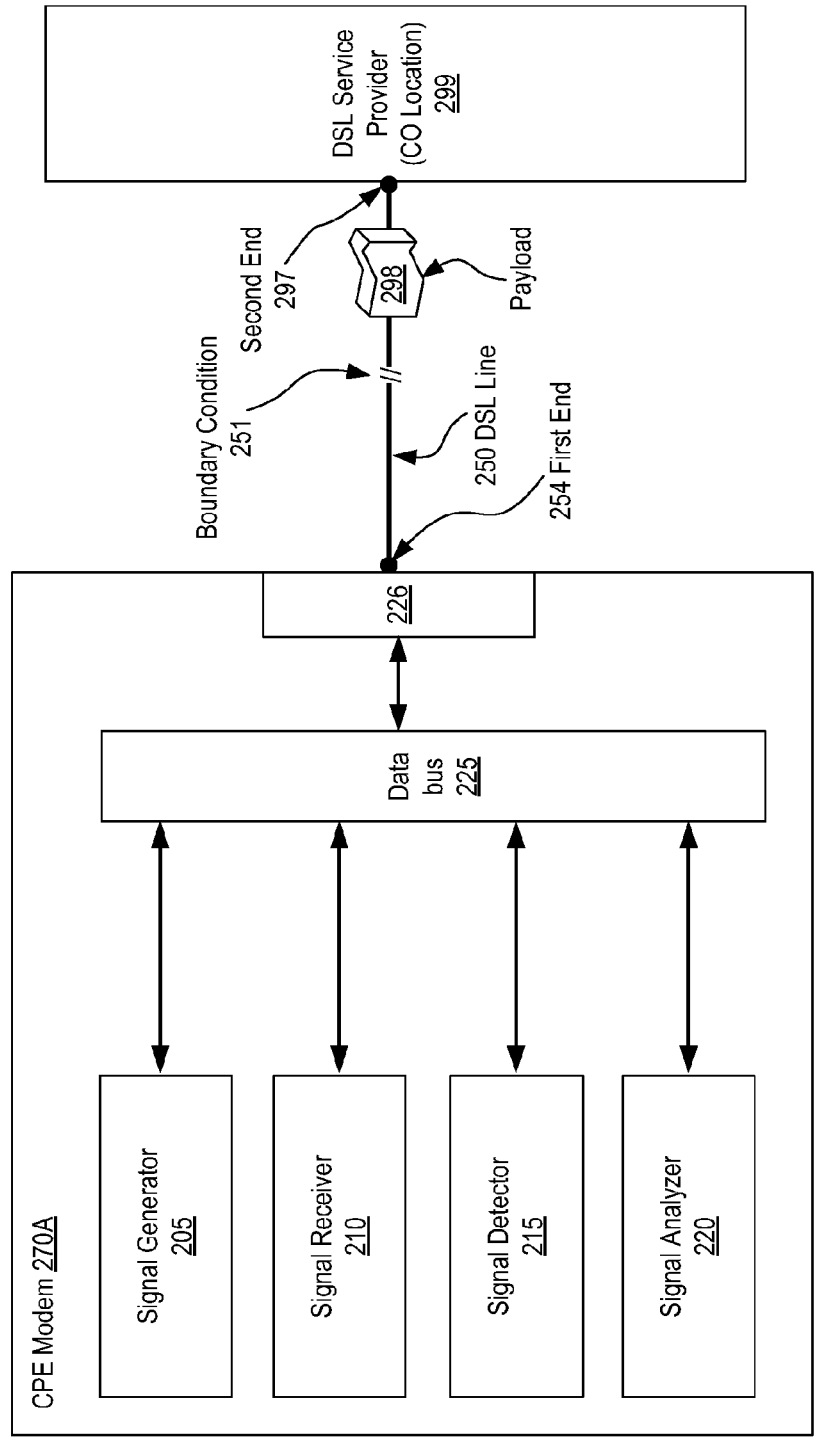

FIG. 2G illustrates an alternative exemplary architecture 207 in which embodiments may operate. FIG. 2G depicts the apparatus 170 as a CPE modem 270A interfaced to a DSL service provider 299.

Thus, in accordance with one embodiment, apparatus 170 includes a CPE modem 270A at the first end 254 of the DSL line 250 and the CPE modem 270A communicates payload 298 information onto the DSL line 250 via differential mode communication to a DSL service provider 299 at a second end 297 of the DSL line 250. In one embodiment, the signal generator 205 injects the common mode signal probe 221 onto the first end 254 of the DSL line during SHOWTIME operation of the CPE modem 270A without causing the CPE modem 270A to terminate communicating the payload 298 information via differential mode communication.

In one embodiment, the apparatus 170 (whether part of the CPE modem 270A or separate therefrom) injects the common mode signal probe 221 at a decibel (dB) established to attenuate below a disruptive threshold level to the CPE modem 270A-B communicably interfaced with the DSL line 250. In such an embodiment, noise above the disruptive threshold level attributable to the injected common mode signal probe 221 causes the CPE modem to fault while noise below the disruptive threshold level attributable to the injected common mode signal probe 221 is non-disruptive to SHOWTIME communications of the CPE modem. Thus, the established dB is tuned or calibrated in such a way that both the common mode signal probe 221 injected for purposes of diagnostics and payload 298 data communicated on behalf of, for example, a customer utilizing the CPE modem 270A-B may both be simultaneously present on the DSL line 250 during SHOWTIME operation without causing the CPE modem 270A-B to fault, reset, or otherwise disrupt service to the customer.

Figure 2H:
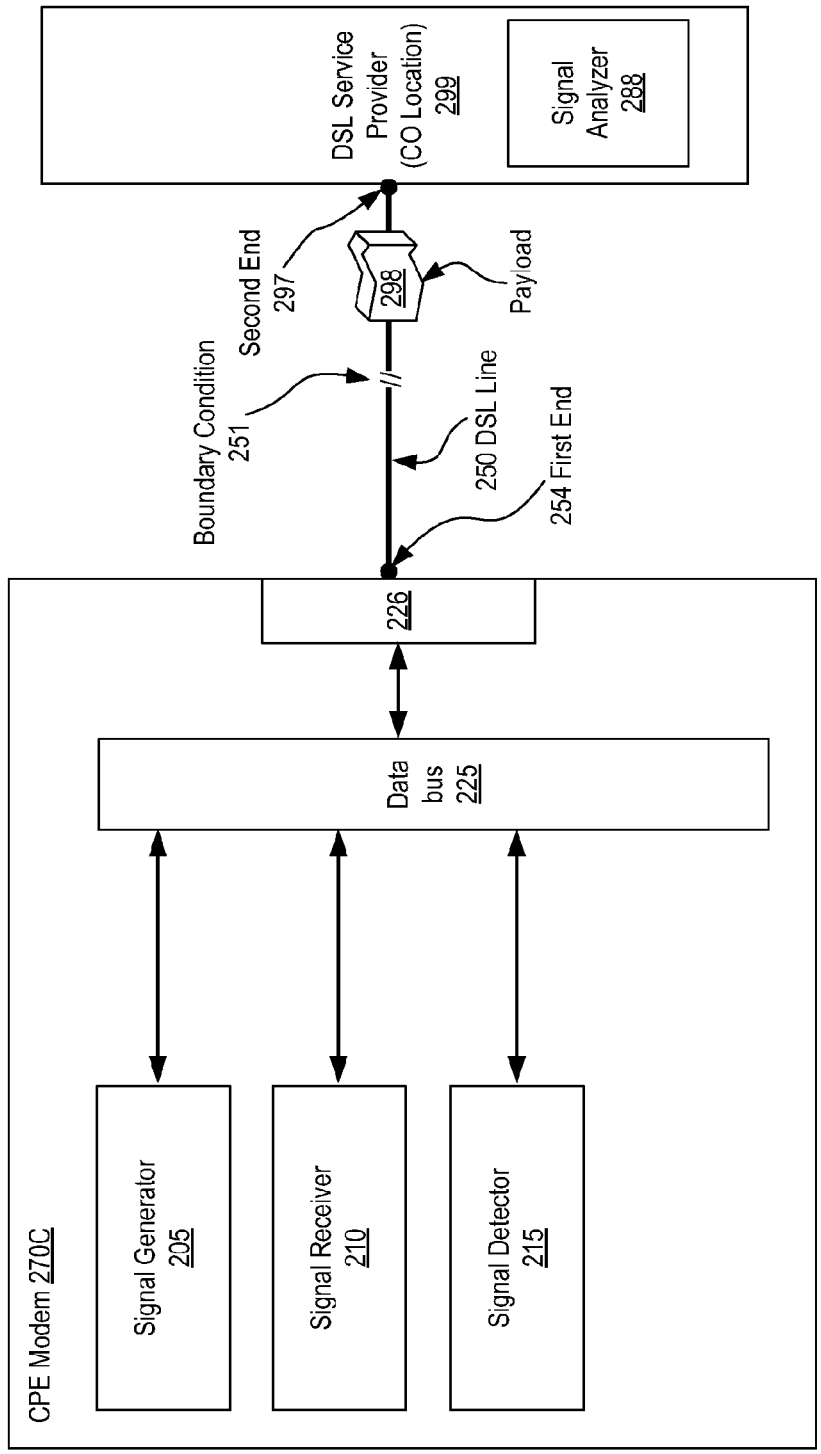

FIG. 2H illustrates an alternative exemplary architecture 208 in which embodiments may operate. FIG. 2H depicts the apparatus 170 as a CPE modem 270C interfaced to a DSL service provider 299. Here the CPE modem communicates with the DSL service provider 299 which includes a signal analyzer 288 to perform the analysis of the injected signals and probes as described above. Thus, in accordance with one embodiment, one of a CPE modem, a controller card, or a signal conditioning device injects a probe and receives the signal, and then transmits the received signal to a remote server, such as the DSL service provider having the signal analyzer therein, so that the received signal may be analyzed. In alternative embodiments the received signal is transmitted to a third party for analysis, separate from the CPE side at which the CPE modem is located and separate from the CO side providing the DSL service. For example, the third party may be an entity which provides DSL optimization services but does not directly provide DSL services to end-user customers. Thus, in accordance with one embodiment, methods, techniques, and instructions include sending the impedance anomaly detected on the DSL line to a remote entity for signal analysis to support the operation of correlating the impedance anomaly on the DSL line to a boundary condition on the DSL line.

FIG. 3A illustrates an alternative exemplary architecture 300 in which embodiments may operate. FIG. 3A depicts an apparatus 170 which is communicably interfaced to a first end of a DSL line 350, for example, through an interface 326 of the apparatus. Apparatus 170 includes several components which are interconnected through a data bus 325.

In accordance with one embodiment, apparatus 170 includes: a signal generator 305 to inject differential mode signal probes 321 onto two conductors of a Digital Subscriber Line (DSL line) 350; a signal detector 310 to measure a common-mode rejection ratio (CMRR) of the differential mode signal probes 321 and in which the signal detector 310 is to further measure impedance of the differential mode signal probes 321; and a signal analyzer 320 to identify which of an asymmetric fault condition or a symmetric fault condition is present on the line based on both: (a) the measured CMRR of the differential mode signal probes 321 and (b) the measured impedance of the differential mode signal probes 321. For example, fault condition 351 is depicted on the DSL line 350 and apparatus 170 identifies the fault condition 351 as symmetric or asymmetric.

In accordance with one embodiment, apparatus 170 injects the differential mode signal probes 321 onto the two conductors of the DSL line 350 by injecting inversed differential mode signal probes 321 onto the two conductors of the DSL line 350. For example, by injecting the differential mode signal probes 321 onto each of two conductors of the DSL line 350 at 180 degrees to each other via a differential transmitter.

In accordance with one embodiment, apparatus 170 measures the impedance of the differential mode signal probes 321 by measuring a reflectometry waveform 322. An alternative technique for obtaining a common-mode rejection ratio reflectometry waveform is by injecting a common mode signal but reading the common mode signal in differential mode. Such a technique is thus distinguishable from the injection of differential mode signal probes 321 as is set forth above. In one embodiment, time-domain reflectometry is used to analyze the reflectometry waveform 322.

In accordance with one embodiment, apparatus 170 measures the CMRR of the differential mode signal probe by converting the measured CMRR to detect the reflectometry waveform 322. In such an embodiment, the signal detector 310 measures the impedance of the differential mode signal probes 321 by measuring a reflection coefficient of the differential mode signal probes 321 and by converting the measured reflection coefficient to a reflectometry waveform 322.

In accordance with one embodiment, the signal analyzer 320 of apparatus 170 further correlates the measured common-mode rejection ratio of the differential mode signal probes 321 and the measured impedance of the differential mode signal probes 321 to an asymmetric fault on the DSL line 350. For example, in one embodiment, the correlation includes: (a) detecting a first fault the measured common-mode rejection ratio, (b) detecting a second fault in the measured impedance of the differential mode signal probes, (c) comparing the first fault detected with the second fault detected; and (d) determining the first fault and the second fault are due to an asymmetric fault of on the DSL line. In one embodiment the asymmetric fault on the DSL line 350 corresponds to a bad splice fault condition as determined through the correlation operations above.

In accordance with one embodiment, the signal analyzer 320 of apparatus 170 further correlates the measured common-mode rejection ratio of the differential mode signal probes 321 below a minimum threshold indicating no anomaly and the measured impedance of the differential mode signal probes 321 to a symmetric fault on the DSL line. For example, in one embodiment, the symmetric fault on the DSL line 350 corresponds to a bridged tap fault condition or is identified as a bridged tap fault condition type. For example, where the measured common-mode rejection ratio is at or near enough to zero in accordance with a threshold level in conjunction with the measured impedance for the same DSL line 350, the fault condition 351 is determinable as symmetric.

Although the signal analyzer 320 is depicted internal to apparatus 170 in accordance with the depicted embodiment, such an apparatus 170 may operate without a signal analyzer and transmit the reflectometry waveform 322 received by the signal detector 310 to a remote entity, as is described above in the discussion of FIG. 2H. For example, the signal analyzer 320 may be offloaded to a remote entity such as a DSL services provider at the CO side or to anther remote entity, such as a third party which provides DSL optimization services. For example, in accordance with one embodiment, methods, techniques, and instructions include sending the common-mode rejection ratio (CMRR) of the differential mode signal probes as measured and the impedance of the differential mode signal probes as measured to a remote entity for signal analysis to support the operation of identifying which of an asymmetric fault condition or a symmetric fault condition is present on the line.

FIGS. 3B, 3C, 3D, 3E, and 3F illustrate alternative exemplary architectures in accordance with which embodiments may operate. Apparatus 170 may be implemented and utilized in a variety of forms including, for example, with the adaptation of a differential transmitter 305A as the signal generator.

Figure 3B:
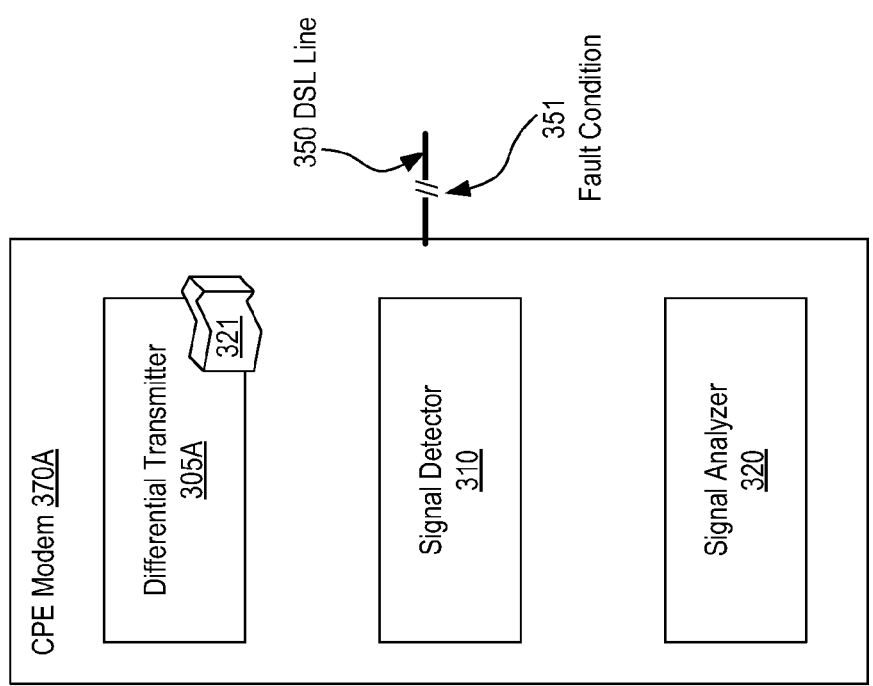

The embodiment of FIG. 3B depicts the signal generator having been implemented via a differential transmitter 305A embodied within a chipset of a Customer Premises Equipment (CPE) modem 370A communicably interfaced with the first end of the DSL line 350 to inject the generated differential mode signal probes 321 onto the DSL line 350.

The embodiment of FIG. 3C depicts the signal generator having been implemented via a differential transmitter 305A embodied within a chipset of a signal conditioning device 375A physically separate and distinct from a CPE modem 370B. In such an embodiment, the CPE modem 370B being communicably interfaced with the signal conditioning device 375A which in turn is communicatively interfaced with the first end of the DSL line 350. In such an embodiment the differential transmitter 305A of the signal conditioning device 375A injects the generated differential mode signal probes 321 onto the DSL line 350.

Figure 3D:
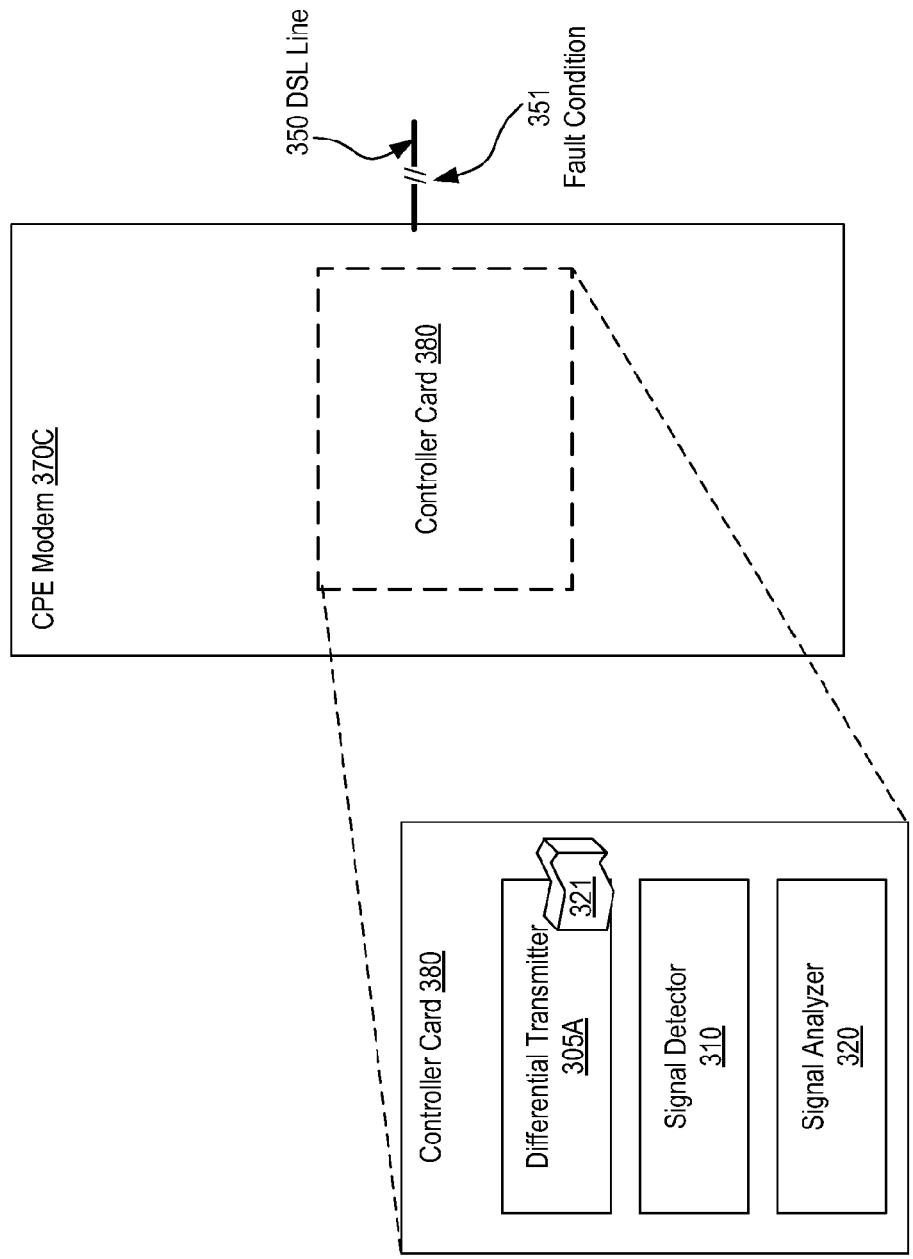

The embodiment of FIG. 3D depicts the signal generator having been implemented via a differential transmitter 305A embodied within a controller card 380 configured within a Customer Premises Equipment (CPE) modem 370C communicably interfaced with the first end of the DSL line 350. In such an embodiment, the differential transmitter 305A of the controller card 380 injects the generated differential mode signal probes 321 via the CPE modem 370C.

Figure 3E:
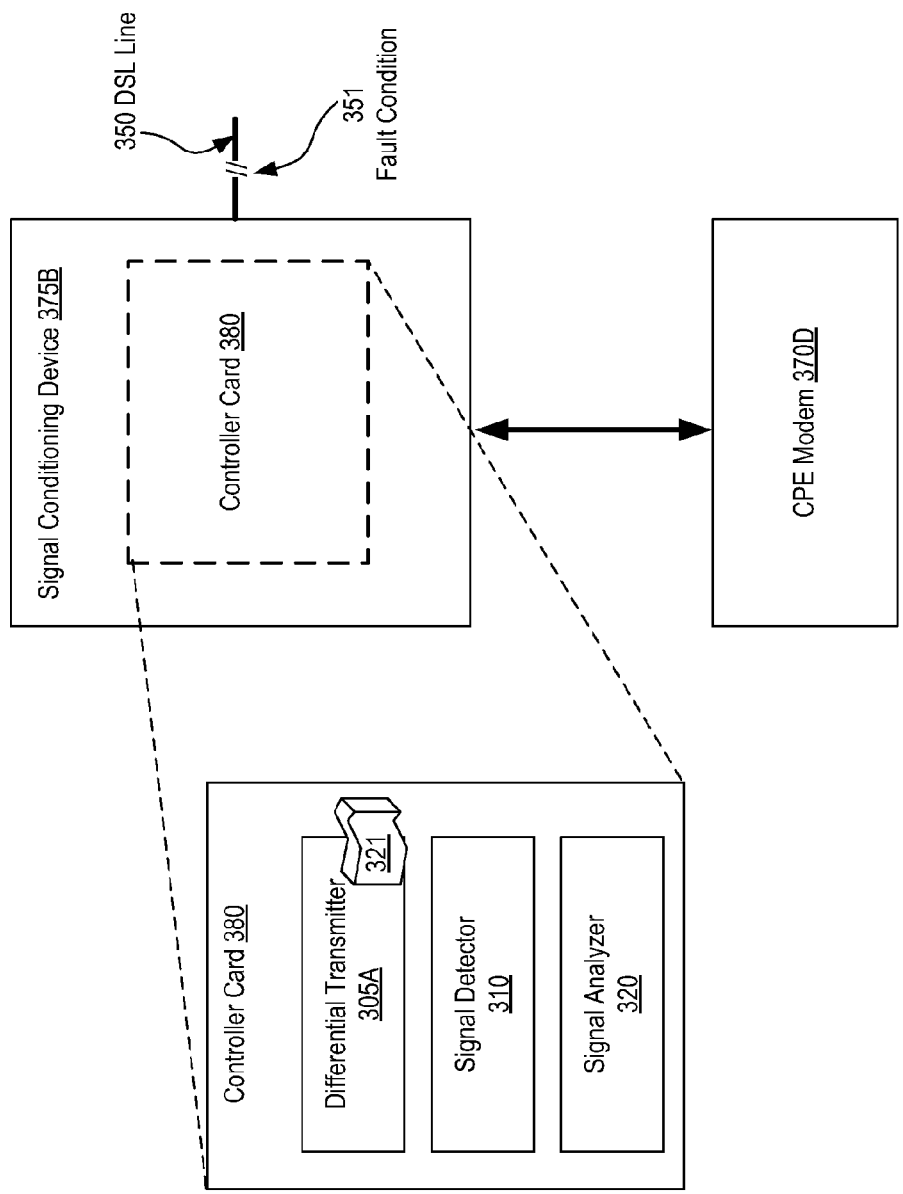

The embodiment of FIG. 3E depicts the signal generator having been implemented via a differential transmitter 305A embodied within a controller card 380 configured within a signal conditioning device 375B physically separate and distinct from a CPE modem 370D. In such an embodiment, the signal conditioning device 375B is communicably interfaced with the first end of the DSL line 350 and the CPE modem 370D is communicatively interfaced to the signal conditioning device 375B. In this embodiment, the differential transmitter 305A of the controller card 380 within the signal conditioning device 375 injects the generated differential mode signal probes 321 onto the DSL line 350.

The embodiment of FIG. 3F depicts the signal generator having been implemented via a differential transmitter 305A embodied within a hand-held diagnostics apparatus 399 temporarily connected with the first end of the DSL line 350 through apparatus 398. The apparatus 398 or the hand-held diagnostics apparatus 399 injects the generated differential mode signal probes 321 onto the DSL line 350. Apparatus 398 may be, for example, one of a CPE modem, a controller card, a signal conditioner device, etc.

Figure 3G:
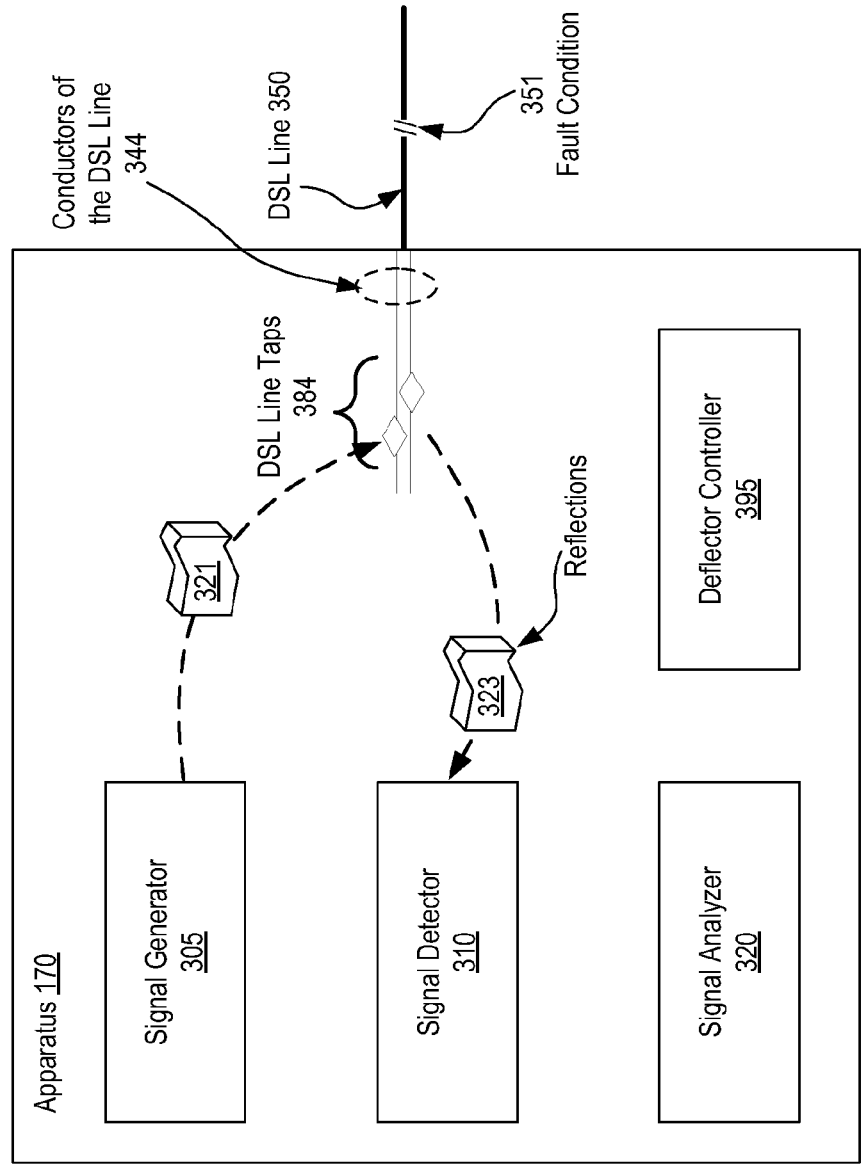

FIG. 3G illustrates an alternative exemplary architecture 307 in which embodiments may operate. FIG. 3G depicts an apparatus 170 in accordance with one embodiment which includes a DSL line tap 384 into each of the two conductors 344 of the DSL line 350. In such an embodiment, the signal generator 305 generates the differential mode signal probes 321 by transmitting the differential mode signal probes 321 onto the DSL line 350 via the DSL line taps 384. In accordance with such an embodiment, the signal detector 310 measures the common-mode rejection ratio (CMRR) and the impedance of the differential mode signal probes 321 by receiving via the DSL line taps 384.

In accordance with one embodiment, apparatus 170 further includes a deflector controller 395 to control the transmitting of the differential mode signal probes 321 from the signal generator 305. In such an embodiment, the deflector controller 395 further controls the receiving of the signal detector 310 for capturing reflections 323 from the injected differential mode signal probes 321 for analysis.

FIG. 3H illustrates an alternative exemplary architecture 308 in which embodiments may operate. FIG. 3H depicts an apparatus 170 in accordance with one embodiment which includes the signal detector is implemented as a common mode receiver 310B coupled with one of the two conductors 344A of the DSL line 350. In such an embodiment, the apparatus 170 measures the common-mode rejection ratio of the differential mode signal probes 321 by receiving a reflection 323 of one of the differential mode signal probes 321 via the common mode receiver 310B operating as the signal detector. In such an embodiment, the signal analyzer 320 further derives the common-mode rejection ratio from the transmitted differential mode signal as received by the common mode receiver 310B.

Figure 3I:
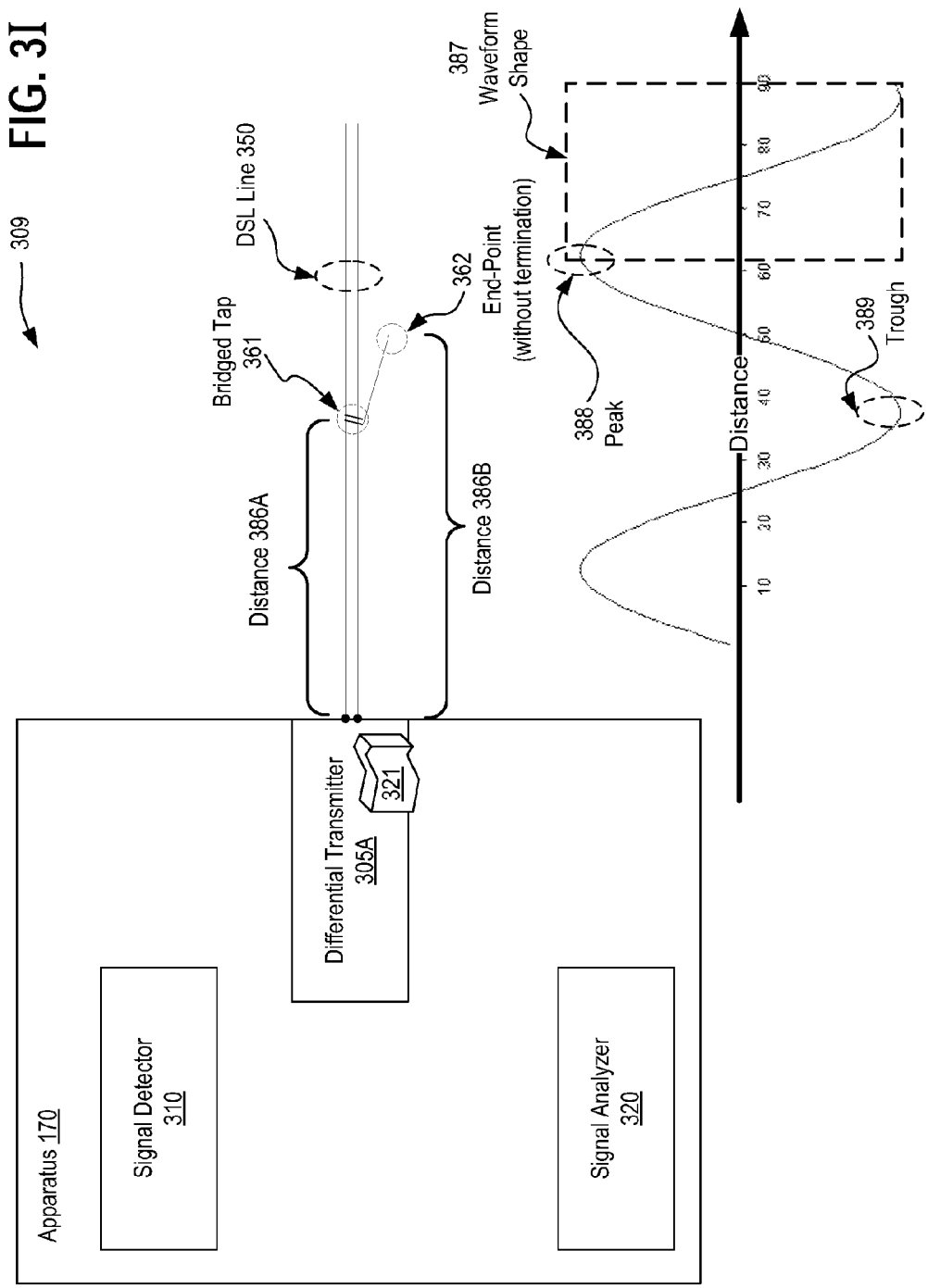

FIG. 3I illustrates an alternative exemplary architecture 309 in which embodiments may operate. FIG. 3I depicts an apparatus 170 in accordance with one embodiment which includes the signal generator implemented as a differential transmitter 305A to inject the differential mode signal probes 321. In such an embodiment, the signal analyzer 320 further: (a) identifies a waveform peak 388 and a waveform trough 389 based on the measured impedance of the differential mode signal probes 321 and (b) correlates the waveform trough 389 to a distance 386A from the differential transmitter 305A having generated the differential mode signal probes 321 to a bridged tap 361 on the DSL line 350, and (c) correlates the waveform peak 388 to a distance 386B from the differential transmitter 305A having generated the differential mode signal probes 321 to an end-point 362 of the bridged tap. In accordance with such an embodiment, the bridged tap ends at the end-point 362 without termination.

In one embodiment, the signal detector 310 measures the impedance of the differential mode signal probes 321 by identifying a waveform shape 387. In such an embodiment, the signal analyzer 320 further derives a first distance 386A from a differential transmitter 305A having generated the differential mode signal probes 321 to a bridged tap 361 on the DSL line 350 and derives a second distance 386B from the differential transmitter 305A having generated the differential mode signal probes 321 to an end-point 362 of the bridged tap 361 which, as above, may end without termination. Although a sine wave is depicted, different waveform shapes 387 may be identified and used to derive the first and second distances 386A-B respectively. While the illustrations are not presented in any particular scale, the relative distances are important. Notably, distance 386B is longer than distance 386A because distance 386B is inclusive of the end-point 362 lacking termination. Accordingly, end-point 362 is determinable through analysis of the waveform shape 387 by corresponding end-point 362 with a peak 388 which is farther than the trough 389.

Figure 3J:
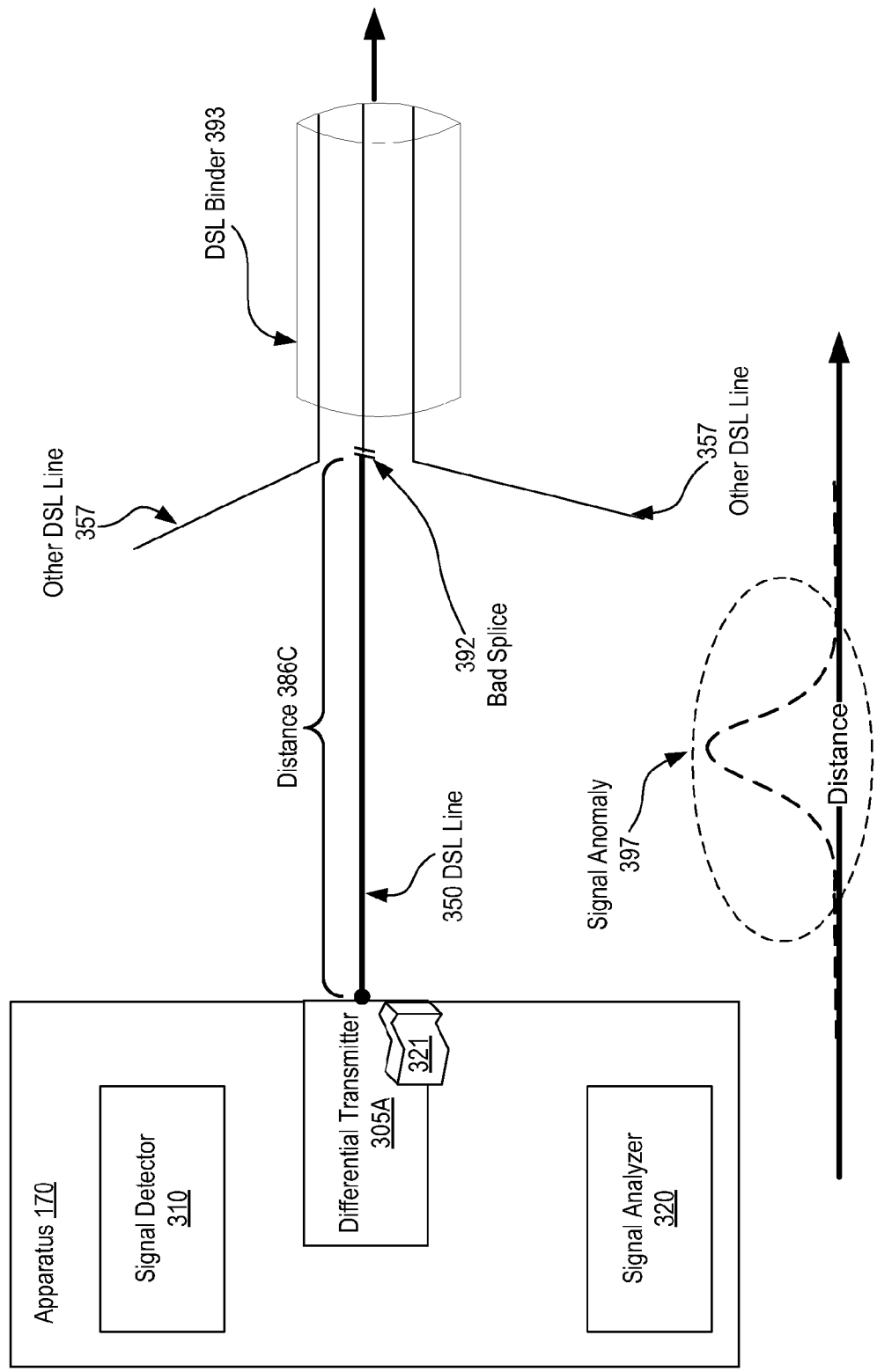

FIG. 3J illustrates an alternative exemplary architecture 311 in which embodiments may operate. FIG. 3J depicts an apparatus 170 in accordance with one embodiment which includes the signal generator implemented as a differential transmitter 305A to inject the differential mode signal probes 321 and in which the signal analyzer further (a) identifies a signal anomaly 397 attributable to a bad splice 392 on the DSL line 350, and (b) correlates the signal anomaly 397 to a distance 386C from a differential transmitter 305A having generated the differential mode signal probes 321 to the bad splice 392 on the DSL line 350. For example, such a bad splice may coincide with interfacing the DSL line into a DSL binder 393 shared amongst other DSL lines 357.

Figure 4A:
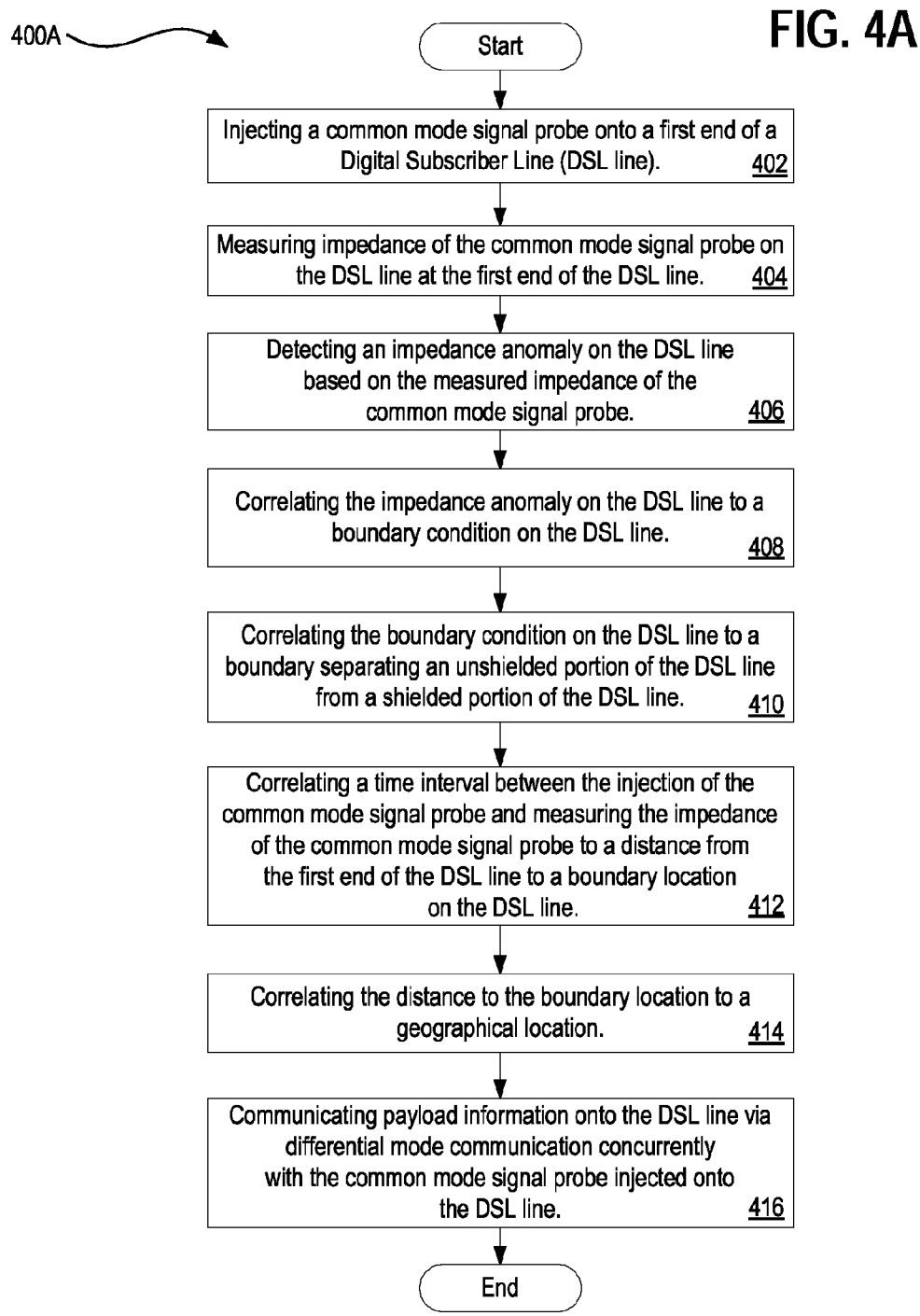

FIGS. 4A and 4B are flow diagrams 400A and 400B respectively, illustrating methods for detecting a boundary condition via common mode diagnostics and methods for detecting a fault condition via common-mode rejection ratio diagnostics in accordance with described embodiments. Methods 400A and/or 400B may be performed by processing logic that may include hardware (e.g., circuitry, dedicated logic, programmable logic, microcode, etc.), software (e.g., instructions run on a processing device to perform various operations such as interfacing, collecting, generating, receiving, monitoring, diagnosing, analyzing, or some combination thereof). In one embodiment, methods 400A and 400B are performed or coordinated via an apparatus such as that depicted at element 170 of FIG. 1 and described throughout. Some of the blocks and/or operations listed below are optional in accordance with certain embodiments. The numbering of the blocks presented is for the sake of clarity and is not intended to prescribe an order of operations in which the various blocks must occur. Additionally, operations from the various flows 400A and 400B may be utilized in a variety of combinations, including in combination with each other.

Method 400A begins with processing logic for injecting a common mode signal probe onto a first end of a Digital Subscriber Line (DSL line) as set forth at block 402.

At block 404, processing logic measures impedance of the common mode signal probe on the DSL line at the first end of the DSL line.

At block 406, processing logic detects an impedance anomaly on the DSL line based on the measured impedance of the common mode signal probe.

At block 408, processing logic correlates the impedance anomaly on the DSL line to a boundary condition on the DSL line.

At block 410, processing logic correlates the boundary condition on the DSL line to a boundary separating an unshielded portion of the DSL line from a shielded portion of the DSL line.

At block 412, processing logic correlates a time interval between the injection of the common mode signal probe and measuring the impedance of the common mode signal probe to a distance from the first end of the DSL line to a boundary location on the DSL line.

At block 414, processing logic correlates the distance to the boundary location to a geographical location.

At block 416, processing logic communicates payload information onto the DSL line via differential mode communication concurrently with the common mode signal probe injected onto the DSL line.

In accordance with one embodiment, there is a non-transitory computer readable storage medium having instructions stored thereon that, when executed by a processor of an apparatus, the instructions cause the apparatus to perform operations comprising: injecting a common mode signal probe onto a first end of a Digital Subscriber Line (DSL line); measuring impedance of the common mode signal probe on the DSL line at the first end of the DSL line; detecting an impedance anomaly on the DSL line based on the measured impedance of the common mode signal probe; and correlating the impedance anomaly on the DSL line to a boundary condition on the DSL line. For example, such instructions may be executed by an apparatus such as a CPE modem, a controller card configured within a CPE modem, a controller card within a signal conditioner device separate from the CPE modem, etc.

Method 400B begins with processing logic for injecting differential mode signal probes onto two conductors of a Digital Subscriber Line (DSL line) as set forth at block 450.

At block 452, processing logic measures a common-mode rejection ratio (CMRR) of the differential mode signal probes.

At block 454, processing logic measures impedance of the differential mode signal probes.

At block 456, processing logic converts the measured CMRR to detect the reflectometry waveform or converts a measured reflection coefficient to a reflectometry waveform.

At block 458, processing logic identifies which of an asymmetric fault condition or a symmetric fault condition is present on the line based on both: (a) the measured CMRR of the differential mode signal probes and (b) the measured impedance of the differential mode signal probes.

At block 460, processing logic correlates the measured common-mode rejection ratio of the differential mode signal probes and the measured impedance of the differential mode signal probes to an asymmetric fault on the DSL line or correlates the measured common-mode rejection ratio of the differential mode signal probes below a minimum threshold indicating no anomaly and the measured impedance of the differential mode signal probes to a symmetric fault on the DSL line.

In accordance with one embodiment, there is a non-transitory computer readable storage medium having instructions stored thereon that, when executed by a processor of an apparatus, the instructions cause the apparatus to perform operations comprising: injecting differential mode signal probes onto two conductors of a Digital Subscriber Line (DSL line); measuring a common-mode rejection ratio (CMRR) of the differential mode signal probes; measuring impedance of the differential mode signal probes; and identifying which of an asymmetric fault condition or a symmetric fault condition is present on the line based on both: (a) the measured CMRR of the differential mode signal probes and (b) the measured impedance of the differential mode signal probes. For example, such instructions may be executed by an apparatus such as a CPE modem, a controller card configured within a CPE modem, a controller card within a signal conditioner device separate from the CPE modem, etc. Such differential mode signal probes may be injected via, for example, a signal generator such as a differential transmitter.

FIG. 5 shows a diagrammatic representation of a system 500 in accordance with which embodiments may operate, be installed, integrated, or configured.

In one embodiment, system 500 includes a memory 595 and a processor or processors 596. For example, memory 595 may store instructions to be executed and processor(s) 596 may execute such instructions. Processor(s) 596 may also implement or execute implementing logic 560 having logic to implement the methodologies discussed herein. System 500 includes communication bus(es) 515 to transfer transactions, instructions, requests, and data within system 500 among a plurality of peripheral devices communicably interfaced with one or more communication buses 515. System 500 further includes management interface 525, for example, to receive requests, return responses, and otherwise interface with network elements located separately from system 500.

In some embodiments, management interface 525 communicates information via an in-band or an out-of-band connection separate from LAN and/or WAN based communications. The "in-band" communications are communications that traverse the same communication means as payload data (e.g., content) being exchanged between networked devices and the "out-of-band" communications are communications that traverse an isolated communication means, separate from the mechanism for communicating the payload data. An out-of-band connection may serve as a redundant or backup interface over which to communicate control data and instructions between the system 500 other networked devices or between the system 500 and a third party service provider. System 500 includes LAN interface 530 and WAN interface 535 to communicate information via LAN and WAN based connections respectively. System 500 further includes stored historical information 550 that may be analyzed or referenced when conducting long term analysis and reporting.

Distinct within system 500 is apparatus 570 which includes signal generator 571, signal receiver 572, signal detector 573, and signal analyzer 574. Apparatus 570 may be installed and configured in a compatible system 500 as is depicted by FIG. 5, or embodied in various forms such as a controller, chip set, CPE modem, signal conditioning device, hand-held diagnostics apparatus, etc.

In accordance with one embodiment, a system 500 includes at least a processor, memory, and the apparatus 570. In one embodiment, the apparatus of system 500 includes a signal generator 571 to inject a common mode signal probe onto a first end of a Digital Subscriber Line (DSL line); a signal receiver 572 to measure impedance of the common mode signal probe on the DSL line at the first end of the DSL line; a signal detector 573 to detect an impedance anomaly on the DSL line based on the measured impedance of the common mode signal probe; and a signal analyzer 574 to correlate the impedance anomaly on the DSL line to a boundary condition on the DSL line.

In accordance with an alternative embodiment, the apparatus of system 500 includes a signal generator 571 to inject differential mode signal probes onto two conductors of a Digital Subscriber Line (DSL line); a signal detector 573 to measure a common-mode rejection ratio (CMRR) of the differential mode signal probes and in which the signal detector 573 is to further measure impedance of the differential mode signal probes; and a signal analyzer 574 to identify which of an asymmetric fault condition or a symmetric fault condition is present on the line based on both:

(a) the measured CMRR of the differential mode signal probes and (b) the measured impedance of the differential mode signal probes.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method comprising:
   injecting a common mode signal probe onto a first end of a Digital Subscriber Line (DSL line);
   measuring impedance of the DSL line at the first end of the DSL line upon injection of the common mode signal probe;
   communicating payload information onto the DSL line via differential mode communication from a Customer Premises Equipment (CPE) modem at the first end to a DSL service provider at a second end of the DSL line;
   detecting an impedance anomaly on the DSL line based on the measured impedance; and
   correlating the impedance anomaly on the DSL line to a boundary condition on the DSL line.

2. The method of claim 1:
   wherein measuring the impedance of the DSL line comprises measuring a reflection coefficient at the first end of the DSL line; and
   wherein detecting the impedance anomaly on the DSL line based on the measured impedance comprises detecting a change in the impedance of the DSL line based on the measured reflection coefficient.

3. The method of claim 1, wherein correlating the impedance anomaly on the DSL line to the boundary condition on the DSL line comprises correlating the impedance anomaly on the DSL line to a boundary separating an unshielded portion of the DSL line from a shielded portion of the DSL line.

4. The method of claim 3, wherein detecting the impedance anomaly on the DSL line based on the measured impedance comprises detecting a change in permittivity coincident with the boundary location separating the unshielded portion of the DSL line from the shielded portion of the DSL line.

5. The method of claim 4, wherein a first measured permittivity for the shielded portion of the DSL line is consistent with a shielding material, and further wherein a second measured permittivity for the unshielded portion of the DSL line is consistent with an air space between a conductor of the DSL line and a ground of the DSL line.

6. The method of claim 1, wherein the common mode signal probe comprises a reflectometry pulse.

7. The method of claim 6, wherein the reflectometry pulse is generated via frequency-domain reflectometry.

8. The method of claim 6:
   wherein the first end of the DSL line comprises a Customer Premises Equipment (CPE) end of the DSL line; and
   wherein the reflectometry pulse is injected at the CPE end of the DSL line.

9. The method of claim 8:
   wherein the CPE modem resides at a Customer Premises Equipment location (CPE location) and is communicatively interfaced with equipment at a Central Office location (CO location);
   wherein the reflectometry pulse is injected via a device at the CPE location preceding the CPE modem and communicatively interfaced with the CPE modem.

10. The method of claim 9, wherein the device at the CPE location preceding the CPE modem and communicatively interfaced with the CPE modem comprises a signal conditioning device to inject the reflectometry pulse, and wherein the signal conditioning device further optimizes signals transmitted to and from the CPE modem.

11. The method of claim 9, wherein the device at the CPE location to inject the reflectometry pulse receives instructions to inject the reflectometry pulse from an entity external to the device and separate from the CPE modem.

12. The method of claim 1, wherein correlating the impedance anomaly on the DSL line to the boundary condition on the DSL line comprises:
   correlating a time interval between the injection of the common mode signal probe and measuring the impedance of the of the DSL line at the first end to a distance from the first end of the DSL line to a boundary location on the DSL line.

13. The method of claim 12:
   wherein the distance represents a length of the DSL line between the first end of the DSL line and the boundary location on the DSL line separating an unshielded portion of the DSL line from a shielded portion of the DSL line due to a discontinuity of the DSL line at the boundary location; and
   correlating the distance to the boundary location to a geographical location based on the distance and based further on a known geographical route traversed by the DSL line.

14. The method of claim 1, further comprising:
   generating a notification specifying an estimated distance from a Customer Premises Equipment (CPE) modem connected with the first end of the DSL line and a boundary location derived from the boundary condition.

15. The method of claim 1, further comprising:
   generating a notification indicating a fault at a boundary location derived from the boundary condition, wherein the fault comprises a faulty splice at the boundary location between the DSL line and a DSL binder having a plurality of additional DSL lines therein in addition to the DSL line.

16. The method of claim 1, further comprising:
   generating a notification indicating a fault at a boundary location derived from the boundary condition, wherein the fault comprises a faulty splice at the boundary location within a DSL binder having a plurality of additional DSL lines therein in addition to the DSL line.

17. The method of claim 1, further comprising:
   generating a dispatch instruction to a boundary location derived from the boundary condition, wherein the dispatch instruction specifies a geographical location of a telephone pole based on an estimated distance between the first end of the DSL line and the boundary location, and further wherein the dispatch instruction indicates a fault attributable to the DSL line at the geographical location of a telephone pole.

18. The method of claim 1, wherein communicating payload information onto the DSL line via differential mode communication is performed simultaneously to the method of injecting the common mode signal probe onto the first end of the DSL line; and
wherein injecting the common mode signal probe onto a first end of the DSL line comprises injecting the common mode signal probe onto the DSL line during SHOWTIME operation of the CPE modem without causing the CPE modem to terminate communicating the payload information via differential mode communication.

19. The method of claim 1, wherein injecting the common mode signal probe onto the first end of a DSL line comprises one of:
generating a probe within a chipset of a Customer Premises Equipment (CPE) modem communicably interfaced with the first end of the DSL line and injecting the generated probe;
generating a probe within a chipset of a signal conditioning device physically separate and distinct from a Customer Premises Equipment (CPE) modem, wherein the signal conditioning device is communicably interfaced with the first end of the DSL line and wherein the CPE modem is communicatively interfaced to the signal conditioning device, and further wherein the signal conditioning device injects the generated probe onto the DSL line;
generating a probe within a controller card configured within a Customer Premises Equipment (CPE) modem communicably interfaced with the first end of the DSL line and injecting the generated probe from the controller card via the CPE modem;
generating a probe within a controller card configured within a signal conditioning device physically separate and distinct from a Customer Premises Equipment (CPE) modem, wherein the signal conditioning device is communicably interfaced with the first end of the DSL line, and wherein the CPE modem is communicatively interfaced to the signal conditioning device, and further wherein the controller card of the signal conditioning device injects the generated probe onto the DSL line; and
generating a probe within a hand-held diagnostics apparatus temporarily connected with the first end of the DSL line and injecting the generated probe via the hand-held diagnostics apparatus onto the first end of the DSL line.

20. The method of claim 1:
wherein injecting the common mode signal probe comprises injecting at a decibel (dB) established to attenuate below a disruptive threshold level to a Customer Premises Equipment (CPE) modem communicably interfaced with the DSL line;
wherein noise above the disruptive threshold level attributable to the injected common mode signal probe causes the CPE modem to fault; and
wherein noise below the disruptive threshold level attributable to the injected common mode signal probe is non-disruptive to SHOWTIME communications of the CPE modem.

21. An apparatus comprising:
a signal generator to inject a common mode signal probe onto a first end of a Digital Subscriber Line (DSL line);
a signal receiver to measure impedance of the DSL line at the first end of the DSL line upon injection of the common mode signal probe by the signal generator;
a signal detector to detect an impedance anomaly on the DSL line based on the measured impedance
a signal analyzer to correlate the impedance anomaly on the DSL line to a boundary condition on the DSL line; and
a Customer Premises Equipment (CPE) modem at the first end of the DSL line, wherein the CPE modem is to communicate payload information onto the DSL line via differential mode communication to a DSL service provider at a second end of the DSL line.

22. The apparatus of claim 21, wherein the apparatus comprises one of:
a chipset of a Customer Premises Equipment (CPE) modem communicably interfaced with the first end of the DSL line to inject the generated probe onto the DSL line;
a chipset of a signal conditioning device physically separate and distinct from a Customer Premises Equipment (CPE) modem, wherein the signal conditioning device is communicably interfaced with the first end of the DSL line and wherein the CPE modem is communicatively interfaced to the signal conditioning device, and further wherein the signal conditioning device is to inject the generated probe onto the DSL line;
a controller card configured within a Customer Premises Equipment (CPE) modem communicably interfaced with the first end of the DSL line to inject the generated probe from the controller card via the CPE modem onto the DSL line;
a controller card configured within a signal conditioning device physically separate and distinct from a Customer Premises Equipment (CPE) modem, wherein the signal conditioning device is communicably interfaced with the first end of the DSL line and wherein the CPE modem is communicatively interfaced to the signal conditioning device, and further wherein the controller card of the signal conditioning device is to inject the generated probe onto the DSL line; and
a hand-held diagnostics apparatus temporarily connected with the first end of the DSL line to inject the generated probe via the hand-held diagnostics apparatus onto the first end of the DSL line.

23. The apparatus of claim 21:
wherein the signal receiver to measure the impedance of the DSL line comprises the signal receiver to measure a reflection coefficient at the first end of the DSL line; and
wherein the signal detector to detect the impedance anomaly on the DSL line based on the measured impedance comprises the signal detector to detect a change in the impedance of the DSL line based on the measured reflection coefficient.

24. The apparatus of claim 21, wherein the signal analyzer to correlate the impedance anomaly on the DSL line to the boundary condition on the DSL line comprises the signal analyzer to correlate the impedance anomaly on the DSL line to a boundary separating an unshielded portion of the DSL line from a shielded portion of the DSL line.

25. The apparatus of claim 24, wherein the signal detector to detect the impedance anomaly on the DSL line based on the measured impedance of the common mode signal probe comprises the signal detector to detect a change in permittivity coincident with the boundary location separating the unshielded portion of the DSL line from the shielded portion of the DSL line.

26. The apparatus of claim 25, wherein a first measured permittivity for the shielded portion of the DSL line is consistent with a shielding material, and further wherein a second measured permittivity for the unshielded portion of the DSL line is consistent with an air space between a conductor of the DSL line and a ground of the DSL line.

27. The apparatus of claim 21, wherein the signal analyzer to correlate the impedance anomaly on the DSL line to the boundary condition on the DSL line comprises:
the signal analyzer to correlate a time interval between the injection of the common mode signal probe and the signal receiver measuring the impedance of the DSL line at the first end to a distance from the first end of the DSL line to a boundary location on the DSL line.

28. The apparatus of claim 27, wherein the distance represents a length of the DSL line between the first end of the DSL line and the boundary location on the DSL line separating an unshielded portion of the DSL line from a shielded portion of the DSL line due to a discontinuity of the DSL line at the boundary location; and
correlating the distance to the boundary location to a geographical location based on the distance and based further on a known geographical route traversed by the DSL line.

29. The apparatus of claim 21:
wherein the signal generator to inject the common mode signal probe onto the first end of the DSL line comprises the signal generator of the CPE modem to inject the common mode signal probe onto the DSL line during SHOWTIME operation of the CPE modem without causing the CPE modem to terminate communicating the payload information via differential mode communication.

30. A computer readable storage media having instructions stored thereon that, when executed by one or more processors of an apparatus, the instructions cause the apparatus to perform operations comprising:
injecting a common mode signal probe onto a first end of a Digital Subscriber Line (DSL line);
measuring impedance of the DSL line at the first end of the DSL line upon injection of the common mode signal probe;
communicating payload information onto the DSL line via differential mode communication from a Customer Premises Equipment (CPE) modem at the first end to a DSL service provider at a second end of the DSL line;
detecting an impedance anomaly on the DSL line based on the measured impedance; and
correlating the impedance anomaly on the DSL line to a boundary condition on the DSL line.

31. The computer readable storage media of claim 30, wherein detecting the impedance anomaly on the DSL line based on the measured impedance comprises detecting a change in the impedance of the DSL line based on the measured reflection coefficient.

32. The computer readable storage media of claim 30, wherein correlating the impedance anomaly on the DSL line to the boundary condition on the DSL line comprises correlating the impedance anomaly on the DSL line to a boundary separating an unshielded portion of the DSL line from a shielded portion of the DSL line.

33. The computer readable storage media of claim 32, wherein detecting the impedance anomaly on the DSL line based on the measured impedance comprises detecting a change in permittivity coincident with the boundary location separating the unshielded portion of the DSL line from the shielded portion of the DSL line.

34. The computer readable storage media of claim 33, wherein a first measured permittivity for the shielded portion of the DSL line is consistent with a shielding material, and further wherein a second measured permittivity for the unshielded portion of the DSL line is consistent with an air space between a conductor of the DSL line and a ground of the DSL line.

35. The computer readable storage media of claim 30, wherein correlating the impedance anomaly on the DSL line to the boundary condition on the DSL line comprises:
correlating a time interval between the injection of the common mode signal probe and measuring the impedance of the DSL line at the first end to a distance from the first end of the DSL line to a boundary location on the DSL line.

36. The computer readable storage media of claim 30, wherein the instructions cause the apparatus to perform operations further comprising:
generating a notification specifying an estimated distance from a Customer Premises Equipment (CPE) modem connected with the first end of the DSL line and a boundary location derived from the boundary condition.

37. The computer readable storage media of claim 30, wherein the instructions cause the apparatus to perform operations further comprising:
generating at least one of:
a notification indicating a fault at a boundary location derived from the boundary condition, wherein the fault comprises a faulty splice at the boundary location between the DSL line and a DSL binder having a plurality of additional DSL lines therein in addition to the DSL line;
a notification indicating a fault at a boundary location derived from the boundary condition, wherein the fault comprises a faulty splice at the boundary location within a DSL binder having a plurality of additional DSL lines therein in addition to the DSL line; and
a dispatch instruction to a boundary location derived from the boundary condition, wherein the dispatch instruction specifies a geographical location of a telephone pole based on an estimated distance between the first end of the DSL line and the boundary location, and further wherein the dispatch instruction indicates a fault attributable to the DSL line at the geographical location of a telephone pole.

38. The computer readable storage media of claim 30:
wherein injecting the common mode signal probe onto a first end of the DSL line comprises injecting the common mode signal probe onto the DSL line during SHOWTIME operation of the CPE modem without causing the CPE modem to terminate communicating the payload information via differential mode communication.

39. The computer readable storage media of claim 30, wherein the apparatus comprises one of:
a chipset of a Customer Premises Equipment (CPE) modem communicably interfaced with the first end of the DSL line, wherein the instructions cause the CPE modem to inject the generated probe onto the DSL line;
a chipset of a signal conditioning device physically separate and distinct from a Customer Premises Equipment (CPE) modem, wherein the signal conditioning device is communicably interfaced with the first end of the DSL line and wherein the CPE modem is communicatively interfaced to the signal conditioning device, and further wherein the instructions cause the signal conditioning device to inject the generated probe onto the DSL line;

a controller card configured within a Customer Premises Equipment (CPE) modem communicably interfaced with the first end of the DSL line, wherein the instructions cause the controller card to inject the generated probe onto the DSL line via the CPE modem;

a controller card configured within a signal conditioning device physically separate and distinct from a Customer Premises Equipment (CPE) modem, wherein the signal conditioning device is communicably interfaced with the first end of the DSL line and wherein the CPE modem is communicatively interfaced to the signal conditioning device, and further wherein the instructions cause the controller card of the signal conditioning device to inject the generated probe onto the DSL line; and a hand-held diagnostics apparatus temporarily connected with the first end of the DSL line, wherein the instructions cause the hand-held diagnostics apparatus to inject the generated probe onto the first end of the DSL line.

40. The computer readable storage media of claim 30, wherein correlating the impedance anomaly on the DSL line to a boundary condition on the DSL line comprises:

sending the impedance anomaly detected on the DSL line to a remote entity for signal analysis.

\* \* \* \* \*